US012802350B2

(12) United States Patent
Alexander et al.

(10) Patent No.: US 12,802,350 B2
(45) Date of Patent: Nov. 17, 2026

(54) DEVICES, METHODS AND GRAPHICAL USER INTERFACES FOR PREVIEW OF COMPUTER-GENERATED VIRTUAL OBJECTS FOR EXTENDED REALITY APPLICATIONS

(71) Applicant: Apple Inc., Cupertino, CA (US)

(72) Inventors: Jeremiah L. Alexander, Santa Clara, CA (US); Boris Erceg, Santa Cruz, CA (US); Jue Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 227 days.

(21) Appl. No.: 18/733,268

(22) Filed: Jun. 4, 2024

(65) Prior Publication Data

US 2024/0402873 A1 Dec. 5, 2024

Related U.S. Application Data

(60) Provisional application No. 63/506,111, filed on Jun. 4, 2023.

(51) Int. Cl.
*G06F 17/00* (2019.01)
*G06F 3/04815* (2022.01)
(Continued)

(52) U.S. Cl.
CPC .......... *G06T 17/00* (2013.01); *G06F 3/04815* (2013.01); *G06F 3/04845* (2013.01);
(Continued)

(58) Field of Classification Search
CPC ........... G06T 19/006; G06T 7/62; G06T 7/70; G06T 17/00; G06T 2210/12;
(Continued)

(56) References Cited

U.S. PATENT DOCUMENTS 6,552,721 B1 * 4/2003 Ishikawa ............... G06T 17/005
715/848
10,846,940 B1 11/2020 Mcintyre et al.
(Continued)

OTHER PUBLICATIONS

Alchalabi, Oday Qusay A., "Techniques of Using the Virtual Reality in the Reactive Design", Pure and Engineering Sciences, vol. 17, No. 1, The 1st Engineering Education Conference University of Duhok, 17-19, 2012 (Special Issue), 2014, pp. 19-29.
(Continued)

*Primary Examiner* — Mahelet Shiberou
(74) *Attorney, Agent, or Firm* — Kubota & Basol LLP

(57) ABSTRACT

Provided herein are systems and methods for implementing visual content previews for content items associated with a software application. The content preview includes a visual preview of a content item that is updated based on modifications to the application source code. The content preview includes a plurality of viewports, with each viewport being independently controllable. Each viewport of the content preview can be "paused" to prevent the viewport from updating in response to modifications of the source code, while the content previews associated with other viewports are modified with modification to the source code. In this way, a developer can visually compare different versions of a content item when developing content in the preview application. The device displays a bounding volume concurrently with the content preview to visually depict a relationship between the size of content item and the three-dimensional size of a three-dimensional environment associated with the software application.

17 Claims, 17 Drawing Sheets

(51) Int. Cl.

| | |
|---|---|
| ***G06F 3/04845*** | (2022.01) |
| ***G06F 8/34*** | (2018.01) |
| ***G06T 7/62*** | (2017.01) |
| ***G06T 7/70*** | (2017.01) |
| ***G06T 17/00*** | (2006.01) |
| ***G06T 19/00*** | (2011.01) |
| ***G06T 19/20*** | (2011.01) |
| ***G06V 10/25*** | (2022.01) |

(52) U.S. Cl.

CPC .................. *G06F 8/34* (2013.01); *G06T 7/62* (2017.01); *G06T 7/70* (2017.01); *G06T 19/006* (2013.01); *G06T 19/20* (2013.01); *G06V 10/25* (2022.01); *G06T 2200/24* (2013.01); *G06T 2210/12* (2013.01); *G06T 2219/028* (2013.01); *G06T 2219/2016* (2013.01)

(58) Field of Classification Search

CPC ....... G06T 2219/2016; G06T 2219/028; G06T 2200/24; G06F 8/34; G06F 3/04845; G06F 3/04815; G06V 10/25

See application file for complete search history.

(56) References Cited

U.S. PATENT DOCUMENTS

| | | | | |
|---|---|---|---|---|
| 11,972,275 | B1 * | 4/2024 | Weibel | G06F 9/451 |
| 12,039,660 | B1 * | 7/2024 | Duquesne | G06T 15/20 |
| 12,094,072 | B2 | 9/2024 | Chapman et al. | |
| 2016/0170720 | A1 * | 6/2016 | Xue | G06F 8/34 717/113 |
| 2018/0374192 | A1 * | 12/2018 | Kunkel | G06F 3/14 |
| 2019/0147022 | A1 * | 5/2019 | Okada | G06F 40/143 715/234 |
| 2020/0184698 | A1 * | 6/2020 | Mitsui | G06F 3/04847 |
| 2020/0310622 | A1 * | 10/2020 | Faragher | G06T 19/20 |
| 2021/0034319 | A1 * | 2/2021 | Wang | H04N 13/275 |
| 2022/0283692 | A1 * | 9/2022 | Qian | G06F 3/04845 |
| 2022/0318447 | A1 | 10/2022 | Takahashi et al. | |
| 2022/0342384 | A1 | 10/2022 | Gonzalez Martin et al. | |
| 2022/0413691 | A1 * | 12/2022 | Becker | G06F 3/04815 |
| 2023/0064797 | A1 | 3/2023 | Sayers et al. | |
| 2023/0195300 | A1 * | 6/2023 | Matlin | G09G 5/34 715/784 |
| 2023/0377300 | A1 | 11/2023 | Becker et al. | |
| 2024/0096029 | A1 | 3/2024 | Lal et al. | |
| 2024/0176596 | A1 * | 5/2024 | Rakshit | G06F 8/33 |
| 2024/0404194 | A1 | 12/2024 | Alexander et al. | |
| 2024/0404219 | A1 | 12/2024 | Alexander et al. | |

OTHER PUBLICATIONS

Game Development, "Why Are 3d Projections on a 2d Screen Not Like What the Human Eye Sees?", Graphics Programming, Available online at <https://gamedev.stackexchange.com/questions/147024/why-are-3d-projections-on-a-2d-screen-not-like-what-the-human-eye-sees>, [Retrieved from Internet on Aug. 21, 2024], 10 pages.

Schulze, Jürgen P., "Cse 167: Introduction to Computer Graphics Lecture #10: View Frustum Culling", University of California, San Diego. 2015, 31 pages.

See et al., "Extended Reality Interactive Wall: User Experience Design Research-creation", Virtual Creativity, vol. 10, No. 2, 2020, pp. 163-174. [retrieved on Aug. 21, 2024]. Retrieved from the Internet: <URL: https://intellectdiscover.com/content/journals/10.1386/vcr_00030_1?crawler=true>.

Non-Final Office Action received for U.S. Appl. No. 18/733,228, mailed on Feb. 4, 2026, 63 pages.

Non-Final Office Action received for U.S. Appl. No. 18/733,243, mailed on Feb. 4, 2026, 64 pages.

Notice of Allowance received for U.S. Appl. No. 18/733,228, mailed on May 20, 2026, 9 pages.

Notice of Allowance received for U.S. Appl. No. 18/733,243, mailed on Jun. 1, 2026, 9 pages.

* cited by examiner

DEVICES, METHODS AND GRAPHICAL USER INTERFACES FOR PREVIEW OF COMPUTER-GENERATED VIRTUAL OBJECTS FOR EXTENDED REALITY APPLICATIONS

CROSS-REFERENCE TO RELATED APPLICATIONS

This application claims the benefit of U.S. Provisional Application No. 63/506,111, filed Jun. 4, 2023, the content of which is herein incorporated by reference in its entirety for all purposes.

FIELD OF THE DISCLOSURE

This relates generally to computer graphics editors and more specifically to devices, methods and user interfaces for three-dimensional previews of computer graphical objects.

BACKGROUND OF THE DISCLOSURE

Some computer graphical environments provide two-dimensional and/or three-dimensional environments where at least some objects displayed for a user's viewing are virtual and generated by a computer. In some uses, a user may create or modify extended reality (XR) environments, such as by editing, generating, or otherwise manipulating XR virtual objects using a content generation environment, such as a graphics editor or graphics editing interface running on a content creation application, for example. In one or more examples, creation or modification of XR environments, including content items (e.g., two-dimensional and/or three-dimensional objects) within the XR environments, may include generating and presenting, to the user, a preview of the content items at various intermediate stages of the content creation process. However, such previews of content items that are generated and presented to the user in two-dimensions are limited by the two-dimensional display and graphics processing characteristics of the device on which the content creation application runs. Editors that allow for intuitive editing of computer-generated virtual objects presented in both two-dimensions and three-dimensions are thus desirable. Additionally, the previews of content items in a content creation application are detached from the context of the three-dimensional applications in which the content is to be presented. Simulators that allow for intuitive simulation (in two-dimension or three-dimensions) of content items in the context of the three-dimensional applications are thus desirable.

SUMMARY OF THE DISCLOSURE

Some examples of the disclosure are directed to a preview of content (e.g., XR content also referred to herein as XR content item(s)) generated and presented at an electronic device in either a two-dimensional or three-dimensional environment (e.g., in a computer-generated environment). In one or more examples, while the three-dimensional preview of content is presented, one or more affordances are provided for interacting with the one or more computer-generated virtual objects of the preview. Additionally or alternatively, interacting with the one or more computer-generated virtual objects of the preview can be initiated through text-based command line inputs or other non-graphical techniques. In one or more examples, the one or more affordances/selectable options may be displayed on a user interface with the three-dimensional preview of content (e.g., displayed below, in front of, above, adjacent to, etc. the one or more virtual objects of the three-dimensional preview).

In one or more examples, the user interface associated with content preview includes a selectable option that when selected, displays a three-dimensional bounding volume concurrently with the preview of the three-dimensional object. Additionally or alternatively, the three-dimensional bounding volume can be automatically displayed without requiring user interaction to initiate display. The three-dimensional bound volume is generated using size information received at the electronic device associated with a content application. The three-dimensional bounding volume is displayed to show a size relationship between a three-dimensional virtual object being previewed, and the three-dimensional environment of the software application so that a user of the device can efficiently ascertain what portions of the three-dimensional virtual object will be clipped (i.e., not be visible) in the three-dimensional environment due to the portions exceeding the bounds of the three-dimensional environment of the content application or more generally ascertain how a content item will appear in a given three-dimensional environment. In one or more examples, the displayed bounding volume can include size labels, which provide numerical representations of the size of the bounding volume (e.g., length, width, height for a bounding box), for example, as the bounding volume exists in the three-dimensional environment. In one or more examples, the preview of the virtual object is received from a content application and used to generate the preview of the three-dimensional virtual object. By using both the size information associated with the three-dimensional object, and the size information associated with the three-dimensional environment (e.g., the three-dimensional environment associated with the application the content being previewed will be displayed in), the device can display a representation of both, to allow the user to determine what portions of the virtual object will be clipped.

Additionally or alternatively, the electronic device applies one or more visual indicators to the one or more portions of the three-dimensional virtual object preview that will be clipped due to exceeding the bounds of the three-dimensional environment of the content application. Optionally, the visual indicators include applying shading, highlighting, and/or color to the portions of the virtual object that will be clipped. Additionally or alternatively, applying the visual indicators include forgoing display of the clipped portions of an object, or displaying the clipped portions by displaying the clipped portions at a reduced opacity. Optionally, one or more visual indicators can also be applied to the portions of the virtual object that will be not clipped. The one or more visual indicators are configured to visually delineate the portions of the virtual object that will be clipped versus the portions of the virtual object that will not be clipped (i.e., because they fit within the bounds of the three-dimensional environment.) In one or more examples, the device displays the one or more visual indicators concurrently with the three-dimensional bounding volume associated with the three-dimensional environment described above. Additionally or alternatively, the device displays the one or more visual indicators without displaying the bounding volume. Additionally or alternatively, the bounding volume is displayed without the one or more visual indicators.

In one or more examples, the user interface associated with the content preview includes one or more content preview viewports that are configured to display a preview of a virtual object based on the state of the application code associated with the virtual object. In one or more examples, the one or more content preview viewports can operate in a pause mode or in a play mode, and the mode for a respective preview viewport can be toggled between a pause mode and play mode. When the content preview viewport is in the play mode, any modifications made to the application code associated with the virtual object will automatically cause the displayed content preview to be modified in accordance with the modification of the application code. When the content preview viewport is in pause mode, the device creates a snapshot of the application code at the time that the viewport enters the pause mode. While in the pause mode, the viewport will continue to display the preview of the virtual object based on the snapshot and will forgo updating the preview in response to any subsequent modifications to the application code until the respective viewport toggles to the play mode. In one or more examples, the user is able to restore the application code based on a snapshot stored on the electronic device.

The full descriptions of these examples are provided in the Drawings and the Detailed Description, and it is understood that this Summary does not limit the scope of the disclosure in any way.

BRIEF DESCRIPTION OF THE DRAWINGS

For a better understanding of the various described examples, reference should be made to the Detailed Description below, in conjunction with the following drawings in which like reference numerals often refer to corresponding parts throughout the figures.

DETAILED DESCRIPTION

Figure 1:
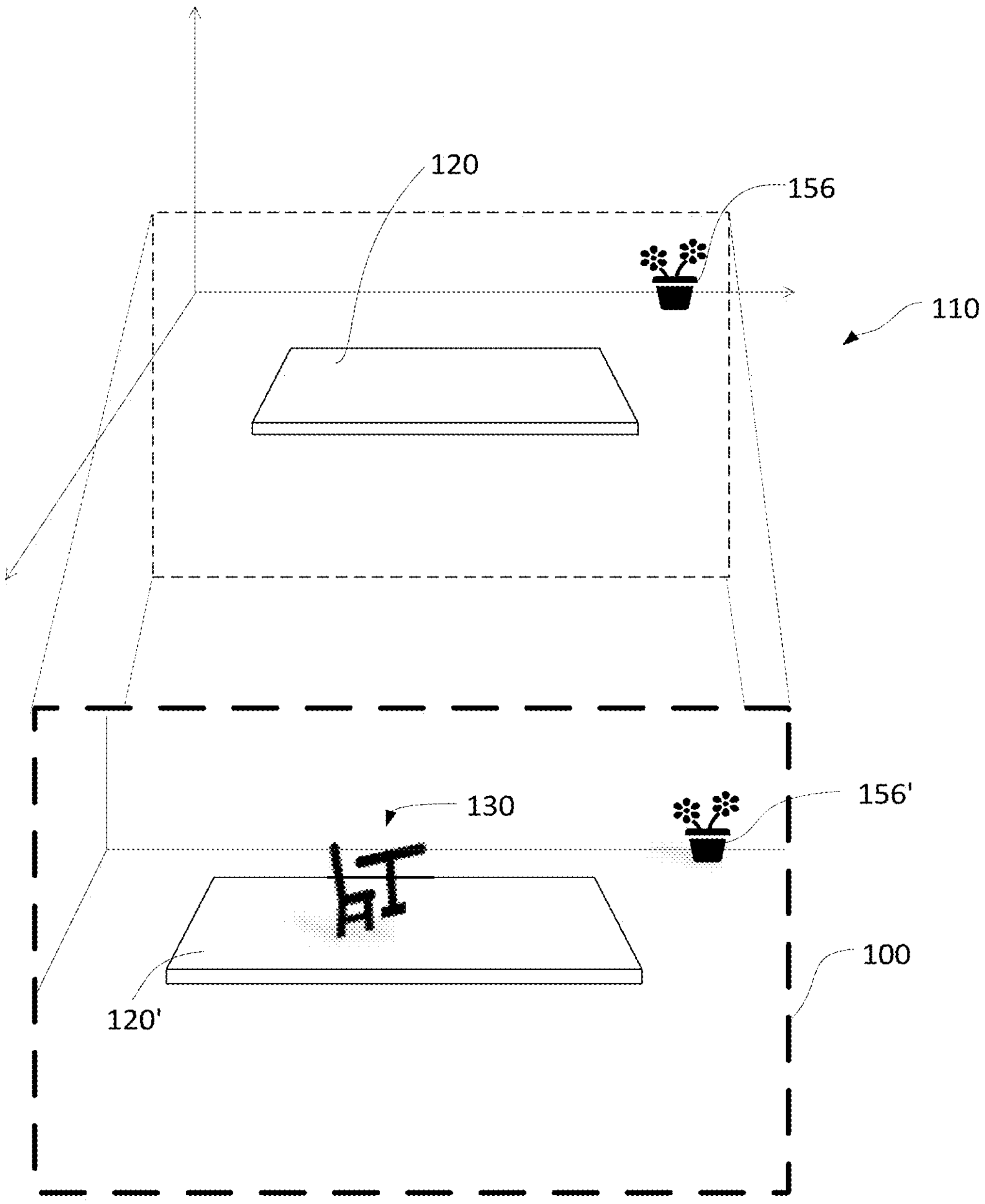
FIG. 1 illustrates an electronic device displaying an extended reality environment according to examples of the disclosure.

XR content (e.g., content that is meant to be displayed in a three-dimensional environment) can be previewed either in three-dimensions (e.g., by using a head mounted display) or on a two-dimensional display that is capable of rendering two-dimensional representations of three-dimensional objects. In one or more examples, an XR content application (e.g., a software application that is configured to display content in a three-dimensional environment) includes one or more virtual objects/content that are displayed in a three-dimensional virtual environment.

In one or more examples, XR content can be presented to the user via an XR data file (data file) (including script, executable code, etc.) that includes data representing the XR content and/or data describing how the XR content is to be presented. In one or more examples, the XR file includes data representing one or more XR scenes and one or more triggers for presentation of the one or more XR scenes. For example, an XR scene may be anchored to a horizontal, planar surface, such that when a horizontal, planar surface is detected (e.g., in the field of view of one or more cameras), the XR scene can be presented. The XR file can also include data regarding one or more virtual objects associated with the XR scene, and/or associated triggers and actions involving the XR virtual objects.

In order to simplify the generation of XR files and/or editing of computer-generated graphics generally, a content creation application including a content generation environment (e.g., an authoring environment graphical user interface (GUI)) can be used. In one or more examples, a content generation environment is itself an XR environment (e.g., a two-dimensional and/or three-dimensional environment). For example, a content generation environment can include one or more virtual objects and one or more representations of real-world objects. In one or more examples, the virtual objects are superimposed over a physical environment, or a representation thereof. In one or more examples, the physical environment is captured via one or more cameras of the electronic device and is actively displayed in the XR environment (e.g., via the display generation component). In one or more examples, the physical environment is (e.g., passively) provided by the electronic device, for example, if the display generation component includes a translucent or transparent element through which the user is able to see the physical environment.

In such a content generation environment, a user can create virtual objects from scratch (including the appearance of the virtual objects, behaviors/actions of the virtual objects, and/or triggers for the behaviors/actions of the virtual objects). Additionally or alternatively, virtual objects can be created by other content creators and imported into the content generation environment, where the virtual objects can be placed into an XR environment or scene. In one or more examples, virtual objects generated in a content generation environment or entire environments can be exported to other environments or XR scenes (e.g., via generating an XR file and importing or opening the XR file in a content creation application or XR viewer application).

Some examples of the disclosure are directed to an application for previewing of content generated and presented at an electronic device in a computer generated environment. In one or more examples, while the three-dimensional preview of content is presented, one or more affordances (i.e., selectable options on a user-interface) are provided for interacting with the one or more computer-generated virtual objects of the three-dimensional preview. In one or more examples, the one or more affordances may be displayed with the three-dimensional preview of content (e.g., displayed below, in front of, above, adjacent to, etc. the one or more virtual objects of the three-dimensional preview).

In some examples, the three-dimensional preview of content is configurable to operate in at least two modes. A first mode (e.g., play mode) can simulate run-time of the content in which one or more actions (e.g., animations, audio clips, etc.) associated with the content can be performed. For example, one or more virtual objects of the three-dimensional preview may be animated to move, and one or more virtual objects can respond to an input to execute additional animations or other behaviors. A second mode (e.g., edit mode) can provide a three-dimensional preview of the content to allow a user to interact with the content for the purposes of editing the three-dimensional content. For example, a user may select an element in the three-dimensional content and the corresponding elements can be selected in the two-dimensional representation of the content generation environment.

In one or more examples, the object manipulator can include a first affordance that is selectable to cause the three-dimensional preview to operate in a first mode. In one or more examples, the object manipulator can include a second affordance that is selectable to cause the three-dimensional preview to operate in a second mode, different than the first mode. In one or more examples, the first and second affordances can be a singular affordance that toggles the mode (e.g., a play/pause button). In one or more examples, the object manipulator can include a third affordance that is selectable to scale dimensions of one or more virtual objects of the preview. In one or more examples, the object manipulator can include a fourth affordance that is selectable to step through executable code associated with playback of the previewed content, causing one or more actions (e.g., animations, audio clips, etc.) to be performed by the one or more virtual objects incrementally with each selection of the fourth affordance. In one or more examples, the object manipulator can also include a fifth affordance that is selectable to cause the three-dimensional preview to operate in a third mode, different than the first mode and the second mode. In the third mode, a full-scale representation of the one or more virtual objects of the three-dimensional preview is displayed within the three-dimensional environment.

As described herein, some examples of the disclosure are directed to user-interactions with and/or manipulations of a three-dimensional preview of content (e.g., XR content item) displayed on an electronic device. In one or more examples, a two-dimensional representation of an XR content item generated in a content creation application displayed on a first electronic device may be concurrently displayed with a three-dimensional preview of the XR content item on a second electronic device. In one or more examples, user interactions (e.g., user input, such as touch, tap, motion, reorientation, etc.) with the three-dimensional preview of the XR content item received at the second electronic device may cause the display of the three-dimensional preview of the XR content item to be updated according to the input. In one or more examples, the user input received at the second electronic device is communicated to the first electronic device in real time, such that the displays of the two-dimensional representation of the XR content item and the three-dimensional preview of the XR content item are optionally manipulated concurrently or nearly concurrently (e.g., within less than 50 ms of one another).

Manipulating the three-dimensional preview of the content may include altering an appearance of one or more virtual objects of the three-dimensional preview. In one or more examples, manipulations of the three-dimensional preview are optionally determined by the mode of operation of the electronic device presenting the three-dimensional environment. In one or more examples, changes to a viewpoint associated with the electronic device may alter a view of the three-dimensional preview visible by the user. In one or more examples, changes to the viewpoint associated with the electronic device may alter an orientation and/or a location of the object manipulator within the three-dimensional environment, such that the object manipulator optionally continues to face the user.

FIG. 1 illustrates an electronic device 100 displaying an XR environment (e.g., a computer-generated environment) according to examples of the disclosure. The example device 100 is meant to illustrate an exemplary context and is non-limiting to the disclosure herein. In one or more examples, electronic device 100 is a hand-held or mobile device, such as a tablet computer, laptop computer, smartphone, or head-mounted display. Examples of device 100 are described below with reference to the architecture block diagram of FIG. 2. As shown in FIG. 1, electronic device 100 and tabletop 120 are located in the physical environment 110. In one or more examples, electronic device 100 may be configured to capture areas of physical environment 110 including tabletop 120 and plant 156 (illustrated in the field of view of electronic device 100). In one or more examples, in response to a trigger, the electronic device 100 may be configured to display a virtual object 130 in the computer-generated environment (e.g., represented by a chair and table illustrated in FIG. 1) that is not present in the physical environment 110, but is displayed in the computer-generated environment positioned on (e.g., anchored to) the top of a computer-generated representation 120' of real-world tabletop 120. For example, virtual object 130 can be displayed on the surface of the computer-generated representation 120' of the tabletop in the computer-generated environment displayed via device 100 in response to detecting the planar surface of tabletop 120 in the physical environment 110. As shown in the example of FIG. 1, the computer-generated environment can include representations of additional real-world objects, such as a representation 156' of real-world plant 156. It should be understood that virtual object 130 is a representative virtual object and one or more different virtual objects (e.g., of various dimensionality such as two-dimensional or three-dimensional virtual objects) can be included and rendered in a three-dimensional computer-generated environment. For example, the virtual object can represent an application or a user interface displayed in the computer-generated environment. In one or more examples, the application or user interface can include the display of content items (e.g., photos, video, etc.) of a content application. In one or more examples, the virtual object 130 is optionally configured to be interactive and responsive to user input, such that a user may virtually touch, tap, move, rotate, or otherwise interact with, the virtual object. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application. Additionally, the device may support an application for generating or editing content for computer generated graphics and/or XR environments (e.g., an application with a content generation environment). Additionally, the device may support a three-dimensional graphic rendering application for generating and presenting XR content and/or XR environments in three-dimensions.

Figure 2:
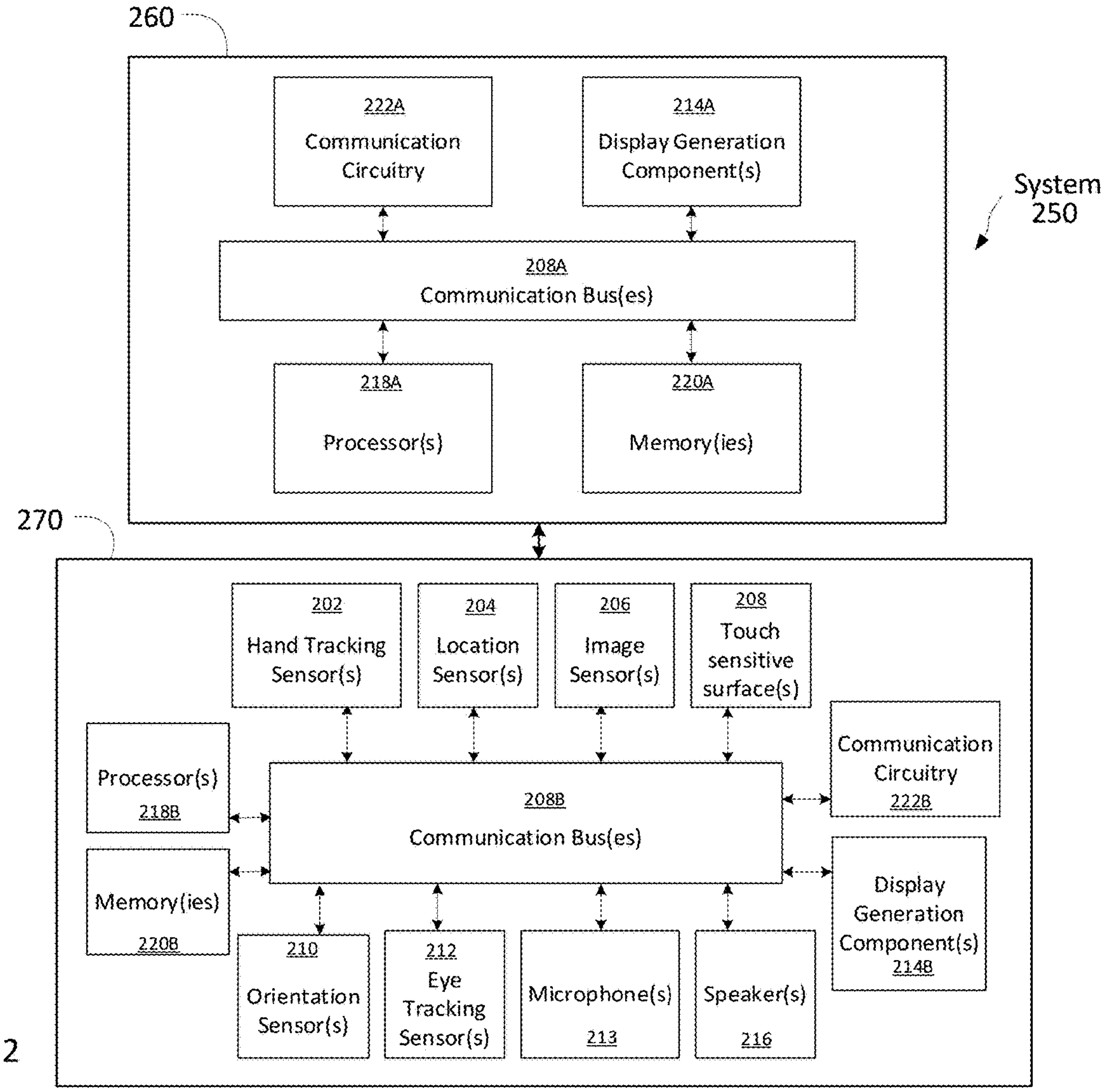
FIG. 2 illustrates a block diagram of an exemplary architecture for a system or device according to examples of the disclosure.

FIG. 2 illustrates a block diagram of an exemplary architecture for a system or device 250 according to examples of the disclosure. In one or more examples, device 250 is a mobile device, such as a mobile phone (e.g., smart phone), a tablet computer, a laptop computer, a desktop computer, a head-mounted display, an auxiliary device in communication with another device, etc. Device 250 optionally includes various sensors (e.g., one or more hand tracking sensor(s), one or more location sensor(s), one or more image sensor(s), one or more touch-sensitive surface(s), one or more motion and/or orientation sensor(s), one or more eye tracking sensor(s), one or more microphone(s) or other audio sensors, etc.), one or more display generation component(s), one or more speaker(s), one or more processor(s), one or more memories, and/or communication circuitry. One or more communication buses are optionally used for communication between the above-mentioned components of device 250.

In one or more examples, as illustrated in FIG. 2, system/device 250 can be divided between multiple devices. For example, a first device 260 optionally includes processor(s) 218A, memory or memories 220A, communication circuitry 222A, and display generation component(s) 214A optionally communicating over communication bus(es) 208A. A second device 270 (e.g., corresponding to device 200) optionally includes various sensors (e.g., one or more hand tracking sensor(s) 202, one or more location sensor(s) 204, one or more image sensor(s) 206, one or more touch-sensitive surface(s) 208, one or more motion and/or orientation sensor(s) 210, one or more eye tracking sensor(s) 212, one or more microphone(s) 213 or other audio sensors, etc.), one or more display generation component(s) 214B, one or more speaker(s) 216, one or more processor(s) 218B, one or more memories 220B, and/or communication circuitry 222B. One or more communication buses 208B are optionally used for communication between the above-mentioned components of device 270. First device 260 and second device 270 optionally communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In one or more examples, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In one or more examples, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In one or more examples, the storage medium is a transitory computer-readable storage medium. In one or more examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on company disc (CD), digital versatile disc (DVD), or Blu-ray technologies, as well as persistent solid-state memory such as flash, solid-state drives, and the like.

In one or more examples, display generation component(s) 214A, 214B include a single display (e.g., a liquid-crystal display (LCD), organic light-emitting diode (OLED), or other types of display). In one or more examples, display generation component(s) 214A, 214B includes multiple displays. In one or more examples, display generation component(s) 214A, 214B can include a display with touch capability (e.g., a touch screen), a projector, a holographic projector, a retinal projector, etc. In one or more examples, device 270 includes touch-sensitive surface(s) 208 for receiving user inputs, such as tap inputs and swipe inputs or other gestures. In one or more examples, display generation component(s) 214B and touch-sensitive surface(s) 208 form touch-sensitive display(s) (e.g., a touch screen integrated with device 270 or external to device 270 that is in communication with device 270).

Device 270 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from device 270. In one or more examples, information from one or more depth sensors can allow the device to identify and differentiate objects in the real-world environment from other objects in the real-world environment. In one or more examples, one or more depth sensors can allow the device to determine the texture and/or topography of objects in the real-world environment.

In one or more examples, device 270 uses CCD sensors, event cameras, and depth sensors in combination to detect the physical environment around device 270. In one or more examples, image sensor(s) 206 include a first image sensor and a second image sensor. The first image sensor and the second image sensor work in tandem and are optionally configured to capture different information of physical objects in the real-world environment. In one or more examples, the first image sensor is a visible light image sensor, and the second image sensor is a depth sensor. In one or more examples, device 270 uses image sensor(s) 206 to detect the position and orientation of device 270 and/or display generation component(s) 214 in the real-world environment. For example, device 270 uses image sensor(s) 206 to track the position and orientation of display generation component(s) 214B relative to one or more fixed objects in the real-world environment.

In one or more examples, device 270 includes microphone(s) 213 or other audio sensors. Device 270 uses microphone(s) 213 to detect sound from the user and/or the real-world environment of the user. In one or more examples, microphone(s) 213 includes an array of microphones (a plurality of microphones) that optionally operate in tandem, such as to identify ambient noise or to locate the source of sound in space of the real-world environment.

Device 270 includes location sensor(s) 204 for detecting a location of device 270 and/or display generation component(s) 214B. For example, location sensor(s) 204 can include a global positioning system (GPS) receiver that receives data from one or more satellites and allows device 270 to determine the device's absolute position in the physical world.

Device 270 includes orientation sensor(s) 210 for detecting orientation and/or movement of device 270 and/or display generation component(s) 214B. For example, device 270 uses orientation sensor(s) 210 to track changes in the position and/or orientation of device 270 and/or display generation component(s) 214B, such as with respect to physical objects in the real-world environment. Orientation sensor(s) 210 optionally include one or more gyroscopes and/or one or more accelerometers.

Device 270 includes hand tracking sensor(s) 202 and/or eye tracking sensor(s) 212, in one or more examples. Hand tracking sensor(s) 202 are configured to track the position/location of one or more portions of the user's hands, and/or motions of one or more portions of the user's hands with respect to the extended reality environment, relative to the display generation component(s) 214B, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214B. In one or more examples, hand tracking sensor(s) 202 and/or eye tracking sensor(s) 212 are implemented together with the display generation component(s) 214B. In one or more examples, the hand tracking sensor(s) 202 and/or eye tracking sensor(s) 212 are implemented separate from the display generation component(s) 214B.

In one or more examples, the hand tracking sensor(s) 202 can use image sensor(s) 206 (e.g., one or more IR cameras, 3D cameras, depth cameras, etc.) that capture three-dimensional information from the real-world including one or more hands (e.g., of a human user). In one or more examples, the hands can be resolved with sufficient resolution to distinguish fingers and their respective positions. In one or more examples, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In one or more examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In one or more examples, both eyes are tracked separately by respective eye tracking cameras and illumination sources, and a focus/gaze can be determined from tracking both eyes. In one or more examples, one eye (e.g., a dominant eye) is tracked by a respective eye tracking camera/illumination source(s).

Device 270 and system 250 are not limited to the components and configuration of FIG. 2, but can include fewer, alternative, or additional components in multiple configurations. In one or more examples, system 250 can be implemented in a single device. A person using system 250, is optionally referred to herein as a user of the device. Attention is now directed towards exemplary concurrent displays of a two-dimensional representation of content items and corresponding three-dimensional previews of the content items. As discussed below, the two-dimensional representation of the content items can be displayed on a first electronic device (e.g., via a content creation application) and the three-dimensional previews of the content items can be concurrently displayed at a second electronic device (e.g., via a three-dimensional graphic rendering application). In one or more examples, the processes of generating the three-dimensional preview of the content items described below can be performed by processors 218A, 218B of the devices 260 and 270.

Figure 3A:
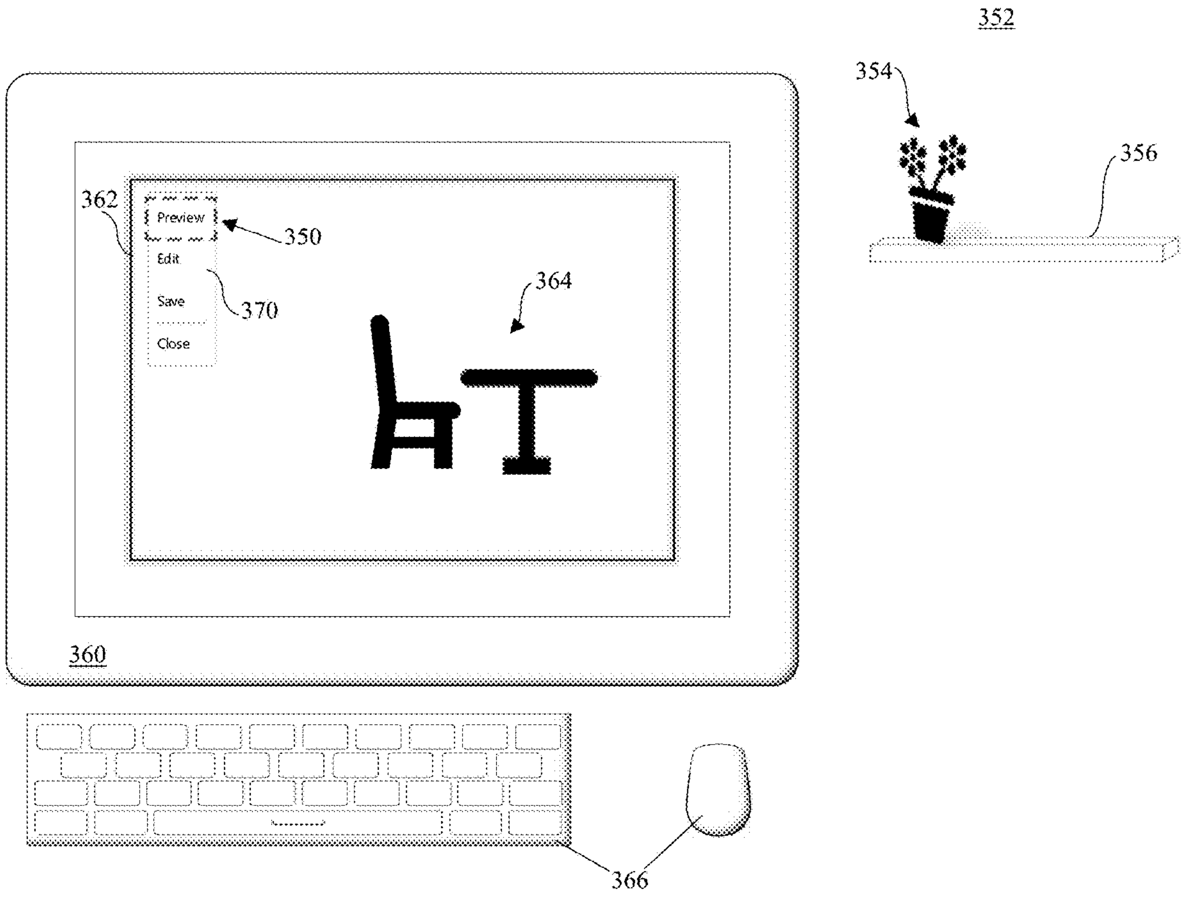
FIG. 3A illustrates a content creation application including an authoring environment graphical user interface and representative content according to some examples of the disclosure.

FIG. 3A illustrates a content creation application 362 including an authoring environment GUI and representative content 364 according to some examples of the disclosure. The content creation application 362 including authoring environment GUI can be displayed on an electronic device 360 (e.g., similar to device 100 or 260) including, but not limited to, portable or non-portable computing devices such as a tablet computing device, laptop computing device or desktop computing device. FIG. 3A illustrates a real-world environment (e.g., a room) 352 including shelf 356 and plant 354 disposed in a rear portion of the real-world environment behind the electronic device 360. As an example, the content creation application 362 may display a two-dimensional representation of a 3D computer environment defined by X, Y and Z axes and including content 364. In the example of FIG. 3A, the content 364 is a chair and a table, but it should be understood that the chair and table are merely representative, and that one or more different virtual objects (e.g., one-dimensional (1D), 2D or 3D objects) can be imported or selected from a content library (including a number of shapes, objects, symbols, text, number, and the like) and included in the 3D environment.

In the example of FIG. 3A, a content item (e.g., an XR content item, such as virtual object 130 in FIG. 1) created in the content creation application 362 running on the electronic device 360 may be previewed in three-dimensions via a three-dimensional graphic rendering application that renders XR content in two or three dimensions, as discussed in more detail below with reference to FIG. 3B. In one or more examples, the content creation application may, optionally in response to a request by the user to preview the content item 364 in three-dimensions, transmit three-dimensional graphical data corresponding to the content item to the three-dimensional graphic rendering application, which may generate and present the three-dimensional preview of the content item.

In one or more examples, as shown in FIG. 3A, the user, via the electronic device 360, may be working in the content creation application 362 to design and/or modify the content 364. The content creation application optionally communicates with an integrated design environment (IDE). The content creation application 362 and/or the IDE (not shown) optionally utilizes a graphical data file (e.g., including script, executable code, etc.) describing a content item (e.g., defining the appearance, actions, reactivity, etc. of the content 364) targeting a three-dimensional operating system (e.g., designed for a three-dimensional graphical environment). In one or more examples, the data file describing the content item may be uploaded to and/or launched by the content creation application 362, such that a two-dimensional representation of the content item may be displayed (e.g., via display generation component 214A in FIG. 2) on the electronic device 360. It is understood that the two-dimensional representation is a function of the two-dimensional display of the first electronic device, but that the two-dimensional representation may represent three-dimensional content. In one or more examples, the two-dimensional representation of the content item may be displayed within a display graphical user interface (GUI) of the content creation application 362 (e.g., within or adjacent to the authoring environment GUI). In one or more examples, the graphical data file being uploaded to the content creation application may be stored on the electronic device 360 (e.g., stored in memory 220A or downloaded and accessed from web-based storage). In one or more examples, the data file may be edited while running on the content creation application 362. In some such examples, the script, executable code, etc. may be displayed within the authoring environment GUI, such that a user may directly edit portions of the script, executable code, etc. at the electronic device 360. The edits made to the graphical data file may, if applicable, update the appearance of the two-dimensional representation of the content 364 displayed on the electronic device 360. As described herein, in one or more examples, edits to the data file may be achieved in an IDE in communication with the content creation application 362.

As mentioned above, the preview of the content items is generated and presented to the user in two-dimensions, as illustrated in the example of FIG. 3A; such preview may be limited by the two-dimensional display of the electronic device 360 on which the content creation application 362 is running. While certain aspects of the content item created in the content creation application 362 can be captured in two-dimensions (e.g., color, two-dimensional dimensions such as height and width, planar views, etc.), other aspects cannot be captured. Particularly, for example, because the content items being created in the content creation application 362 is explicitly designed to be displayed in three-dimensional environments, the two-dimensional preview may not provide the user with complete information regarding three-dimensional appearance and characteristics that could be useful during the design stage. Alternative views (e.g., side and rear views), surface texture, lighting effects, etc. may not be visible or capturable within the two-dimensional preview. Further, in order to view alternative views of the content, for example, the user may need to generate a new preview for each alternative view, increasing the time and effort and thus the complexity of work-flow for designing, previewing, and modifying content items. Accordingly, providing an interactive preview of the content in three-dimensions may be particularly useful during the design stages of the digital content creation process, as discussed below.

In one or more examples, the user may request to preview the two-dimensional representation of the content item (e.g., chair and table of the content 364) in three-dimensions. As an example, the content creation application 362 may display a menu 370 including one or more selectable graphical user interface elements (e.g., displayed in the authoring environment GUI, in the display GUI, or some other GUI in or in communication with the content creation application) that, when selected, generates the request. Additionally or alternatively, in one or more examples, the request may be inputted using one or more input devices 366 in communication with the electronic device 360, such as by pressing one or more keys on a keyboard, for example. As shown in the example of FIG. 3A, the user may select "Preview" from the menu 370, as indicated by selection 350, to request a preview of the content 364 in three dimensions. In one or more examples, in response to receiving the preview request, the electronic device may initiate a data transfer of the three-dimensional graphical data defining the content item (e.g., table and chair of the content 364), wherein the three-dimensional graphical data is optionally transferred to a second electronic device. The electronic device 360 may communicate with the second electronic device via any suitable communication means, such as, for example, wire or cable transfer (e.g., universal serial bus), wireless transfer (e.g., Wi-Fi or Bluetooth®), etc. In one or more examples, the three-dimensional graphical data may be received by a three-dimensional graphic rendering application running on the second electronic device, wherein the three-dimensional graphic rendering application is configured to generate and present a three-dimensional preview of the content item defined by the three-dimensional graphical data, as discussed below. Additionally or alternatively, the user can use the same two-dimensional device to preview the content item using the two-dimensional representation of the content item, and the preview can include features (discussed in detail below) to aid the user in visualizing three-dimensional features associated with the virtual object.

Figure 3B:
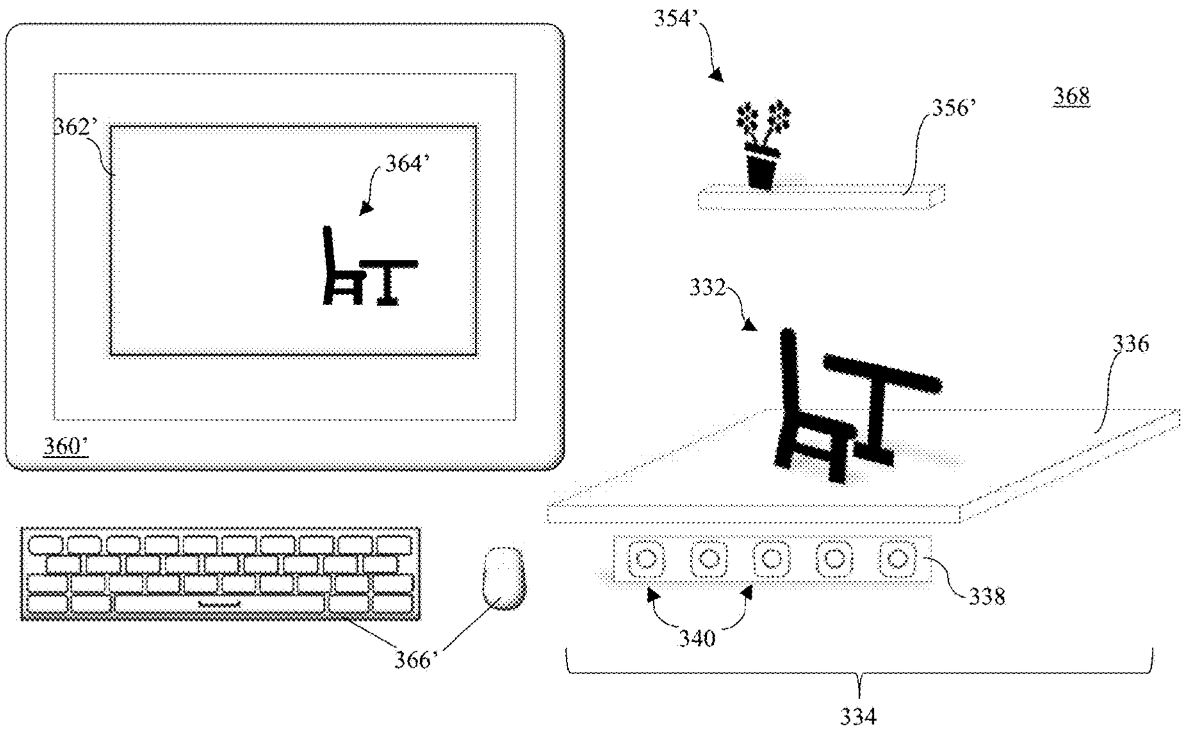
FIG. 3B illustrates an XR environment presented to the user using a second electronic device according to examples of the disclosure.

FIG. 3B illustrates an XR environment presented to the user using a second electronic device (e.g., corresponding to electronic device 270 in FIG. 2) according to examples of the disclosure. As discuss above, while the example of FIG. 3B illustrates the content preview occurring on a second electronic device, the systems and methods described herein can be implemented on a single electronic device and can be implemented using a two-dimensional display or a three-dimensional display. In one or more examples, three-dimensional computer-generated environment 368 can be defined by X, Y and Z axes as viewed from a perspective of the second electronic device (e.g., a viewpoint associated with the second electronic device), which may be a head mounted display, for example). In one or more examples, the second electronic device may capture portions of a real-world environment (e.g., via the image sensors). As shown in FIG. 3B, the three-dimensional computer-generated environment 368 can include presenting a first electronic device 360 displaying the two-dimensional representation of the content item(s) of FIG. 3A (or displaying a representation 360' of the first electronic device and/or a representation 364' of the content item(s) in content application 362'). Additionally or alternatively, the three-dimensional environment 368 includes presenting the one or more input devices 366 (or displaying a representation of the one or more input devices). Although not shown in FIGS. 3A-3B, the first electronic device and the one or more input devices may be resting on a table that can be presented in the environment (or a representation of the table may be displayed in the environment. Additionally or alternatively, the three-dimensional environment 368 includes presenting portions of the real-world environment including a shelf 356 and a plant 354 or representation of the shelf 356' and the plant 354'.

Additionally, or alternatively, the three-dimensional environment 368 optionally includes a three-dimensional preview 334 presenting one or more virtual objects 332 corresponding to the content 364 shown in FIG. 3A. It should be understood that the virtual objects illustrated are merely representative, and that one or more different virtual objects can be imported or designed within the content creation application and included in the 3D environment 368. In one or more examples, concurrently displaying the three-dimensional preview 334 and the content creation application on the first electronic device. In this way, a designer may be able to create content using familiar editing tools and augment the design process with a three-dimensional live preview. Additionally, the three-dimensional preview can provide the designer with additional ways of interacting with the content of the three-dimensional preview and/or with the content in the content creation application on the first electronic device.

For example, in one or more examples, the second electronic device optionally includes hand tracking sensors (e.g., corresponding to hand tracking sensors 202) and eye tracking sensors (e.g., corresponding to eye tracking sensors 212), which may allow the user to interact with and manipulate one or more virtual objects within the three-dimensional environment. As an example, the eye tracking sensors may track the gaze associated with one or both eyes of the user to determine the viewpoint associated with the second electronic device, and thus a direction of the viewpoint within the three-dimensional environment. The hand tracking sensors, for example, may track the movement of one or more fingers of the user to associate respective finger motions (e.g., touch/tap, pinch, drag, etc.) with one or more interactions with one or more elements of the three-dimensional environment. The user may provide input corresponding to selection and/or manipulation of one or more elements within the three-dimensional environment via the respective finger motions.

As shown in FIG. 3B, the three-dimensional environment optionally includes an interactive tray (“tray”) 336 on which the three-dimensional representations 332 of the content is presented within the three-dimensional environment 368. The user may interact with and/or manipulate the interactive tray 336 and/or or the contents of the interactive tray 336. For example, the interactions with the three-dimensional preview 334 of the content can cause the content to be repositioned in two or three-dimensions (e.g., moved in the plane of the tray and/or moved above or below the tray) and/or reoriented (e.g., rotated) within the three-dimensional environment 368. As shown, the three-dimensional environment may also include an interactive toolbar (“toolbar,” “object manipulator”) 338 associated with the interactive tray 336 and including one or more user interface elements (affordances) 340 which may receive user input. In one or more examples, some or all of the affordances can be selectable to control an appearance and/or one or more actions of the one or more virtual objects 332 of the three-dimensional preview 334. As discussed in detail below, the user may interact with one or more of the affordances 340 to activate one or more modes of the device (e.g., a first mode, a second mode, or a third mode), which may allow the user to view an animation of the one or more virtual objects, to select a virtual object of the one or more virtual objects for editing, and/or scale and project full-sized renderings of the one or more virtual objects within the three-dimensional environment, among other examples. It should be understood that, in one or more examples, the interactive tray 336 and/or the toolbar 338 (and associated affordances 340) are optionally not displayed within the three-dimensional environment 368. For example, in one or more examples, the three-dimensional preview 334 may comprise the one or more virtual objects 332, without including interactive tray 336 and toolbar 338. Additionally or alternatively, in one or more examples, for example, an affordance or menu (not shown) may be presented within the three-dimensional environment 368 for controlling whether the interactive tray 336 and/or the toolbar 338 are presented within the three-dimensional environment 368.

As discussed herein, the three-dimensional preview of the content concurrently displayed with the two-dimensional representation of the content in the content creation application may provide the user with useful visual feedback regarding the appearance of the content in three-dimensions which may otherwise not be provided via the two-dimensional representation. In one or more examples, edits or modifications to the data file running in the content creation application may produce corresponding changes to the appearance of the three-dimensional preview displayed at the second electronic device. As an example, the user may wish to edit or modify one or more features of the content items and view a new three-dimensional preview of the content item in accordance with the edits or modifications. For example, the user may, via one or more input devices in communication with the first electronic device (e.g., via a keyboard), rewrite portions of the script, executable code, etc. of the data file while the two-dimensional representation of the content item is displayed on the first electronic device and the three-dimensional preview of the content item is concurrently displayed on the second electronic device. The user may finalize the edits or modifications (e.g., by saving the changes to the data file) and may request a new preview of the content item representing the data file. Additionally or alternatively, the new preview may be automatically requested once the edits or modifications are finalized by the user. The new (e.g., newly updated) data may be transferred from the content creation application to the three-dimensional rendering application in the manner described above, and the three-dimensional preview of the content item currently displayed on the second electronic device may be updated according to the corresponding changes to the two-dimensional representation of the content item displayed on the first electronic device, such that the three-dimensional preview of the content item has an updated appearance.

As mentioned above, the three-dimensional preview 334 of the content item may be displayed on the second electronic device while the two-dimensional representation 364' of the content item is concurrently displayed on the representation 360' of the first electronic device. In one or more examples, the two-dimensional representation of and the three-dimensional preview of the content may be provided at a single electronic device (e.g., a laptop computer, desktop computer, mobile device, etc.), rather than separately provided at two electronic devices. For example, the three-dimensional graphic rendering application may be provided within or at least partially as, a simulator configured to display a computer-generated environment in three-dimensions. In some such examples, in response to receiving a request to display a content item in three-dimensions, the three-dimensional graphic rendering application may generate and present a preview of the content in three-dimensions within the computer-generated environment of the simulator (e.g., in a different window on the display of the electronic device). In some such examples, the two-dimensional representation of the content may be displayed within the display GUI of the content creation application while the three-dimensional preview of the content is concurrently displayed within the computer-generated environment of the simulator, for example. Additionally or alternatively, in one or more examples, the content creation application may be communicatively linked directly to the three-dimensional graphic rendering application. In some such examples, all or portions of the script, executable code, etc. of the data file at 310 may be transferred directly to the three-dimensional graphic rendering application at 318.

In one or more examples, the graphical data communicated along the communication channel between the first electronic device 360 and the second electronic device may be synchronized. In some such examples, for example, the communication channel between the content creation application 362 and the three-dimensional rendering application (not shown) may be bidirectional, allowing data to be selectively transferred therebetween in either direction, as dictated by the operating mode of the second electronic device (e.g., the head-mounted display).

In one or more examples of the disclosure, content preview applications store a duplicate copy of application source code and use the duplicate copy to preview the content items associated with the application. This allow a developer to manipulate the content item in ways which are not possible in the constraints imposed by conventional simulation applications. In some examples (and as described in further detail below), a preview application using a duplicate copy of the source code allows for full camera controls (so that the developer can view the content item from multiple perspectives), content selection, and custom rendering of virtual objects (e.g., by creating custom shapes and sizes for the virtual objects). A preview application as described above, and explained in detail further below, effectively create a three-dimensional canvas that the developer can use as a content creation tool driven by data provided by the application being previewed.

Figure 4A:
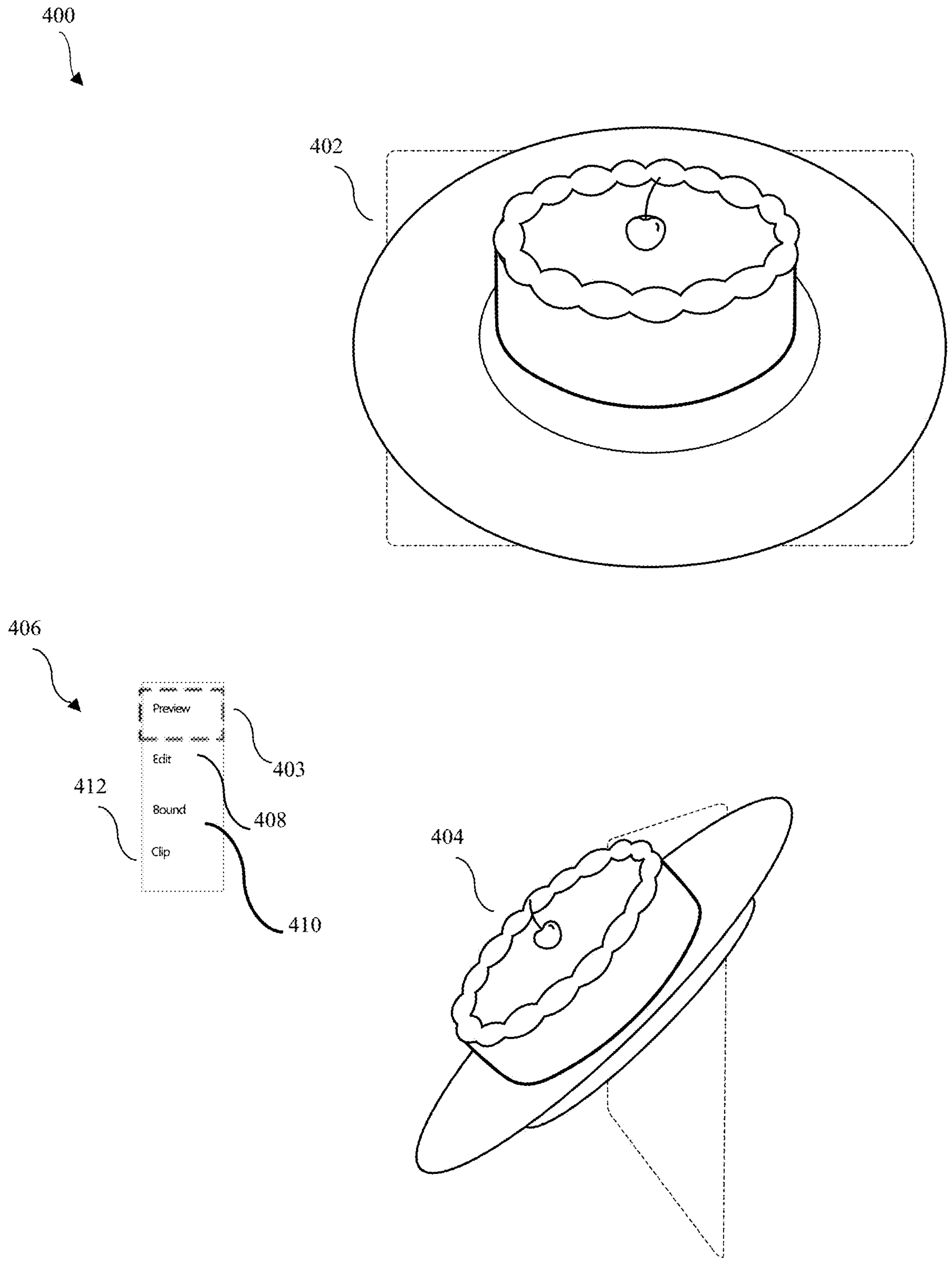
FIGS. 4A-4E illustrate exemplary user interfaces and/or user interactions with one or more objects of a preview of content within a three-dimensional environment according to examples of the disclosure.

FIGS. 4A-4S illustrate exemplary user interfaces and/or user interactions with one or more objects of a three-dimensional preview 434 of content 432 within a three-dimensional environment 468 according to examples of the disclosure. It may be advantageous for the user to view the three-dimensional preview from various angles and perspectives, in various sizes and orientations, and to test and view animations and related actions associated with the content items of the three-dimensional preview. As discussed below, various methodologies are provided for interacting with and manipulating the three-dimensional preview of the content item and the three-dimensional environment which the content item will be displayed in such that an enhanced and improved user experience is provided for viewing the content item in three-dimensions.

In one or more examples, a user previewing a content item according to the examples described above will want to understand how the content item will be visualized when it is placed within a three-dimensional environment generated by a content application. For instance, depending on the size of the content item, as well as the orientation/location of the object, at least a portion of the content item may fall outside of a three-dimensional environment, thus making the portion of the content not visible to the user while the user is interacting with the three-dimensional environment. While editing the content item or adjusting the location of the content item in the three-dimensional environment, the user may want to understand how any edits being applied to a content item, will affect the user's perception of the item when the content item is rendered in a three-dimensional environment and may also understand the size of the content item with respect to the three-dimensional environment it will be rendered in. The size/volume of a three-dimensional environment can vary depending on the application that is rendering the three-dimensional environment, as well as the device that the application is running on. For instance, a particular XR content application may only be allocated a portion of the XR environment while it is operating. Thus, in one or more examples, the content items associated with a XR application may be limited to the size of the application environment rather than the size of the total XR environment. Any portion of the content item exceeding the bounds of the application environment (even though it may be smaller than the total bounds of the XR environment) may be "clipped" (i.e., not displayed). Thus, in one or more examples, in order to provide an enhanced and improved user experience as described above, the preview application described above includes one or more user interfaces (described in further detail below) that allow for a user to visualize how the user will perceive the content item when the content item is placed into a given three-dimensional environment associated with a XR application.

FIGS. 4A-E illustrate exemplary user interfaces 400 and/or user interactions with one or more objects (e.g., content items 402 and 404) of a three-dimensional preview according to examples of the disclosure. In one or more examples, the exemplary user interfaces of FIGS. 4A-4E are configured to allow a user previewing content to also preview how the content will fit into a given three-dimensional space, and are configured to also allow the user to preview what portion of the content will be visible to a user who is viewing a given virtual environment. The exemplary user interactions to follow continue the examples illustrated in FIGS. 3A-3B and discussed above. As discussed below, various methodologies are provided for interacting with and manipulating the three-dimensional preview of the content item, such that an enhanced and improved user experience is provided for viewing the content item.

FIG. 4A illustrates an exemplary user interaction with the user interface 400, wherein the user previews one or more content items 402 and 404. In one or more examples, the content items 402 and 404 represent three-dimensional virtual objects. In some examples, and as illustrated in FIGS. 4A-E, content items 402 and 404 represent different views of the same content item. For instance, content item 402 represents an overhead or view from above of the content item, while content item 404 represents the same virtual object but viewed from a different perspective. Providing multiple viewpoints in a preview of the same content item, allows the user more efficiently preview the item, and understand how the item will fit within a given three-dimensional space as described in further detail blow.

In one or more examples, the user interface presented in FIG. 4A in addition to displaying views of a content item, also includes a menu 406, similar to menu 370 described above with respect to FIGS. 3A-B. In one or more examples, the menu 406 includes one or more selectable options 408, 410, and 412, that when selected, allow for the user to modify the user interface 400 by providing more or less information about the content on the display. For instance, as indicated by selection 403, the menu 406 includes a selectable preview option, that when selected allows the user to view the content item being edited. Optionally, the menu 406 also includes a selection edit option 408 that can provide a three-dimensional preview of the content to allow a user to interact with the content for the purposes of editing the three-dimensional content. For example, a user may select an element in the three-dimensional content and the corresponding elements can be selected in the two-dimensional representation of the content generation environment as described above. Additionally or alternatively, the features described below can be initiated by a simulation application that is configured to simulate features of a software application and do not require user input to be initiated.

In one or more examples, the menu 406 of user interface 400 includes a selectable option 410 for overlaying a three-dimensional bounding volume (e.g., a bounding box) on the displayed content items 402 and 404. As described in further below, when the device receives an indication from the user (e.g., by selection of the selectable option 410) to display a three-dimensional bounding volume in the content preview, the device generates a three-dimensional bounding volume to illustrate how the content item will fit into a given three-dimensional environment. The size of the bounding volume is based on information received from a content application about the size of a three-dimensional environment in which the content item being previewed will be placed into. As discussed in further detail below, placing a bounding volume along with the content item in a preview, allows the user to readily ascertain how the content item (in its current orientation, location, and size) will be perceived in three-dimensional environment.

In one or more examples, the menu 406 of user interface 400 includes a selectable option 412 (labeled "clip" in the figure) that when selected causes the device to apply one or more visual attributes to any portions of a content item that will be "clipped" (i.e., not visible within the three-dimensional environment). As discussed in further detail below. "clipping" the content item in the preview user interface can be done alternatively or in addition to applying a three-dimensional bounding volume to the content preview, thereby providing the user of the electronic device with multiple options to preview how a virtual object (e.g., content item) will appear within a given three-dimensional environment.

Figure 4B:
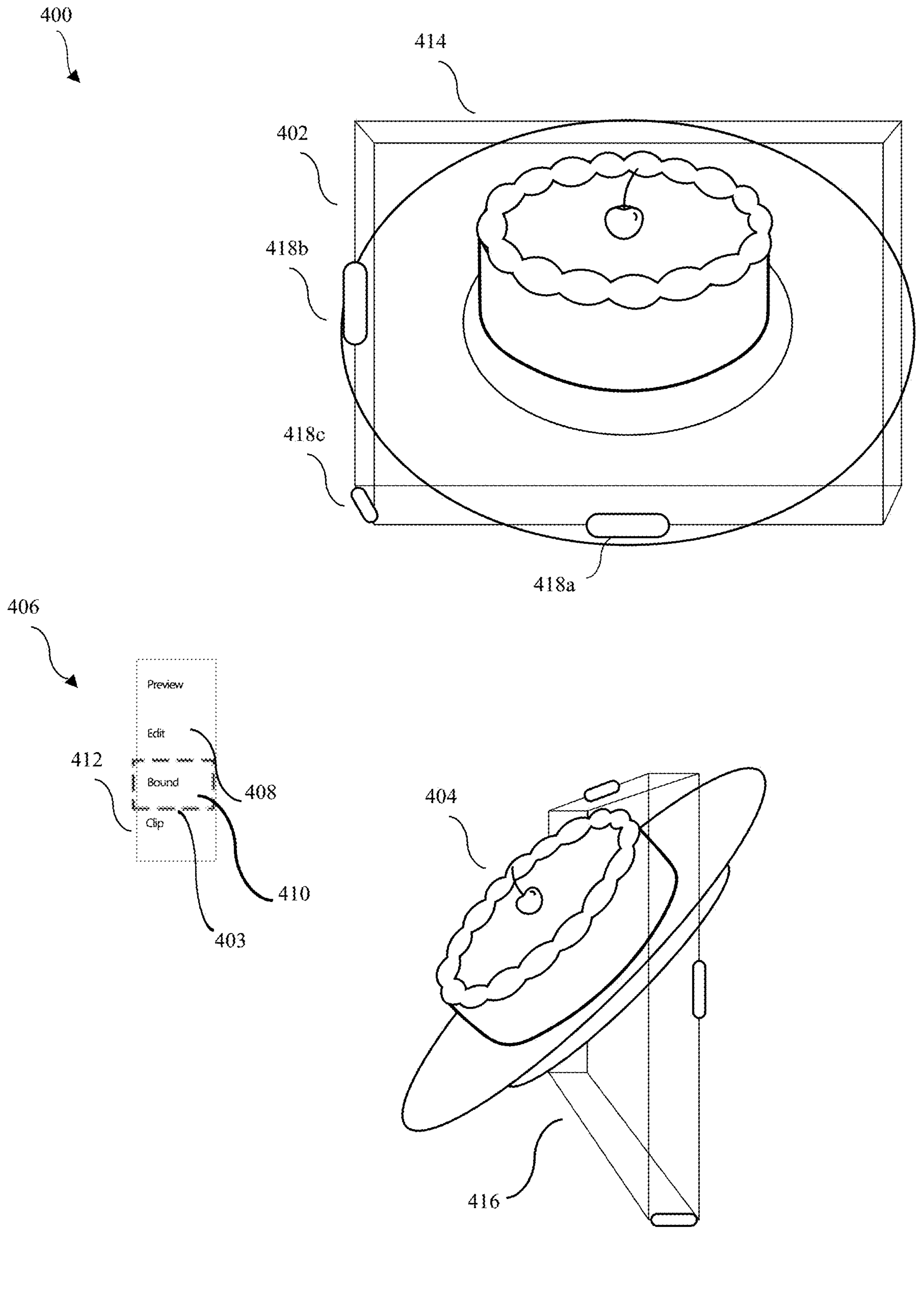

FIG. 4B illustrates another exemplary user interaction with the three-dimensional preview user interface 400, wherein the user previews one or more content items 402 and 404. In the example of FIG. 4B, the device detects selection 403 of selectable option 410 corresponding to displaying a three-dimensional bound volume in the content preview. In one or more examples, and in response to the selection 403 of selectable option 410, the electronic device displays a bounding volume 414 and 416 as illustrated in FIG. 4B. In the example of FIG. 4B, bounding volumes 414 and 416 represent the same bounding volume viewed from differing viewpoints/perspectives similar to the differing viewpoints/perspectives associated with content items 402 and 404 as described above.

In one or more examples, the dimensions of the bounding volume are determined from size information received at the electronic device from a content application associated with the virtual object being previewed (e.g., granted by the operating system of the electronic device). In one or more examples, the size information includes information about the height, width, and length of an application displayed in the three-dimensional environment. The size of an application in the three-dimensional environment is dependent on many factors including but not limited, the type of application displayed in the three-dimensional environment, the type of electronic device used to display the three-dimensional application, other object (real or virtual in the three-dimensional environment, etc. In one or more examples, in addition to or alternatively to receiving size information from a content application associated with the virtual object being previewed, the user of the preview application (e.g., the developer) can specify a bounding volume/size that can be used determine how the virtual object associated with an application would be constrained under different sizes (e.g., bounding volumes). In one or more examples, the user can specify the bounding volume using one or more user interfaces associated with the preview application. For instance, the user can enter size information manually into a user interface, and the preview application can use the entered size information to generate a bounding volume. Additionally or alternatively, the user can specify size information by modifying the source code used to generate the content preview.

In one or more examples, the device also receives size information associated with the content item 402 and 404. In one or more examples, size information about the virtual objects includes but is not limited to the height, length, and width, of the virtual object. Additionally, size information optionally includes position information associated with a position of the virtual object within an application in a three-dimensional environment. For instance, the center of a virtual object may be offset from the center of the application within the three-dimensional environment such that the position of the virtual object will be shifted to a particular side of the application within the three-dimensional environment. Thus, when determining how a content item (e.g., virtual object) will fit within the application within the virtual environment, and whether any portion of the virtual object will not be visible in the three-dimensional virtual environment, the position of the virtual object within the application within the three-dimensional environment is taken into account.

In one or more examples, the size information used to generate the bounding volume 414 and 416 is included as part of the user interface 400. Optionally, the bounding volume 414 includes labels 418*a-c*, with each label corresponding to either the length, width, or height of the bounding volume. For instance, label 418*a* (representing the length of the bounding volume) is placed on an edge of the bounding volume corresponding to the length of the bounding volume. Similarly, label 418*b* (representing the height of the bounding volume) is placed on an edge of the bounding volume corresponding to the length of the bounding volume. Label 418*c* (representing the width of the bounding volume) is similarly placed on an edge of the bounding volume corresponding to the width of the bounding volume. Each label 418*a-c* optionally includes a numeric value corresponding to the dimension the label represents. For instance, label 418*a* includes the numeric value of the length of the bounding volume, 418*b* the numeric value of the height of the bounding volume, and 418*c* the numeric value of the width of the bounding volume.

As illustrated in FIG. 4B, displaying the bounding volumes 414 and 416 in response to receiving an indication to include the bounding volumes allows the user to quickly and efficiently ascertain whether or not the virtual object fits within a three-dimensional environment, or whether one or more portions of the virtual object will fall outside the three-dimensional environment, and thus will not be visible within the three dimensional environment. For instance, in the example user interface 400 of FIG. 4B, one or more portions of content item 402 overlap with and appear outside of the three-dimensional bounding volume 414. The one or more portions of content item 402 that appear outside bounding volume 414 will not be displayed in the three-dimensional environment displayed by the content application associated with the content item 402 and the bounding volume 414, since those portions of the content item do not fit within the three-dimensional object.

In one or more examples, viewing the content item and the bounding volume from multiple perspectives in the same user interface reveals additional portions of the content item that are outside of the bounding volume and thus will not be displayed in the three-dimensional environment associated with the content application. For instance, and as illustrated in FIG. 4B, content item 404 (which represents the same content item 402 from a different perspective) is shown as exceeding the dimensions of bounding volume 416. Since the perspective of content item 404 is different from content item 402, the view provided by content item 404 reveals that additional portions of the content item 404 are outside of the bounding volume 416, even though those corresponding portions of content item 402 appears to be within the bounds of bounding volume 414.

Figure 4C:
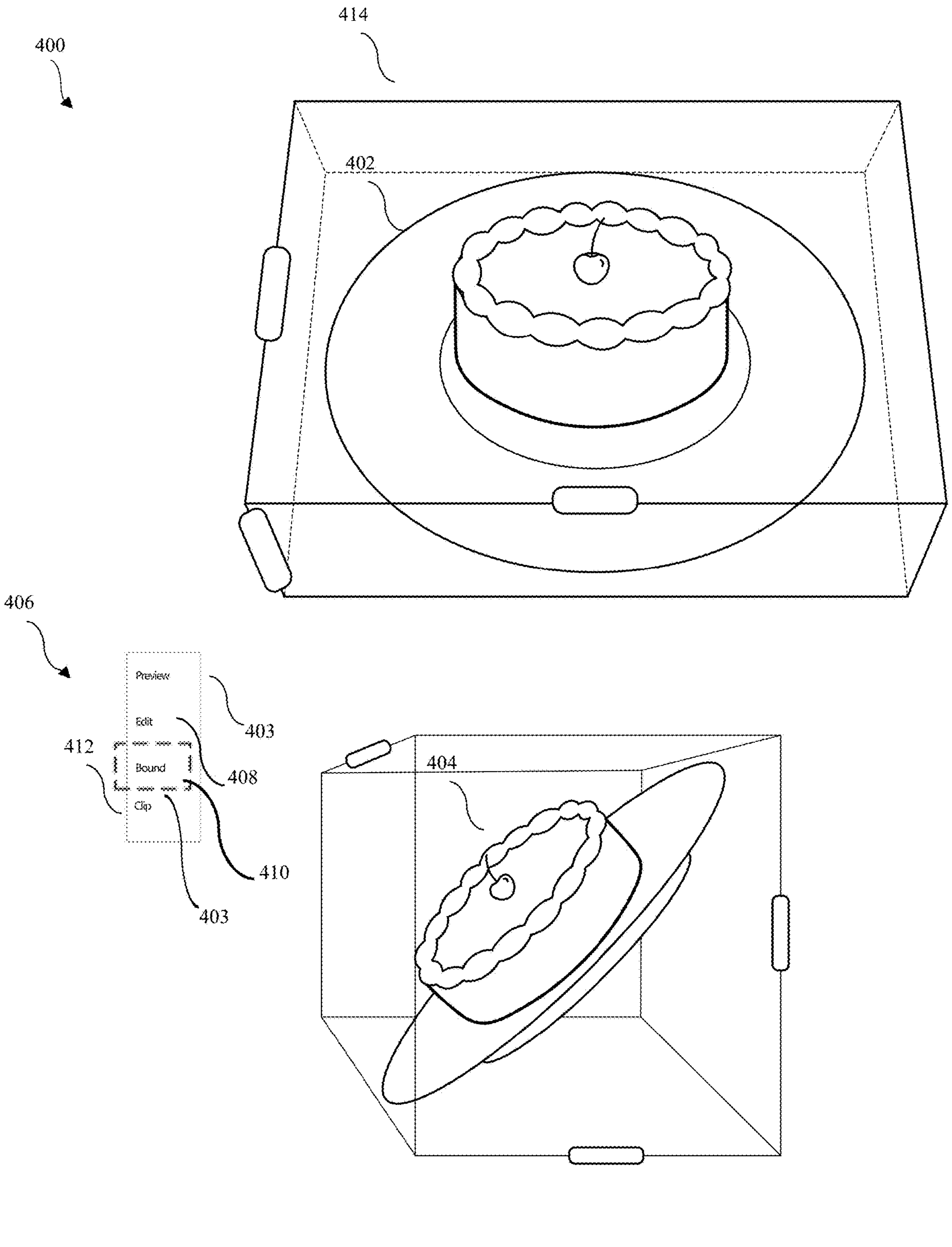

FIG. 4C illustrates an example in which the content items 402 and 404 are contained within the bounding volumes 414 and 416. If the content items fit completely within the bounding volume as illustrated in FIG. 4C, then the entirety of the content item will be visible in the corresponding three-dimensional environment of the content application associated with the content item and the three-dimensional environment. Thus, in the example of FIG. 4C, the user interface confirms to the user that the content item 402 and 404 will fully be visible in the three-dimensional environment running on the content application associated with the content items, without any portions of the content being clipped (i.e., not visible) due to exceeding the bounds of the three-dimensional environment.

Figure 4D:
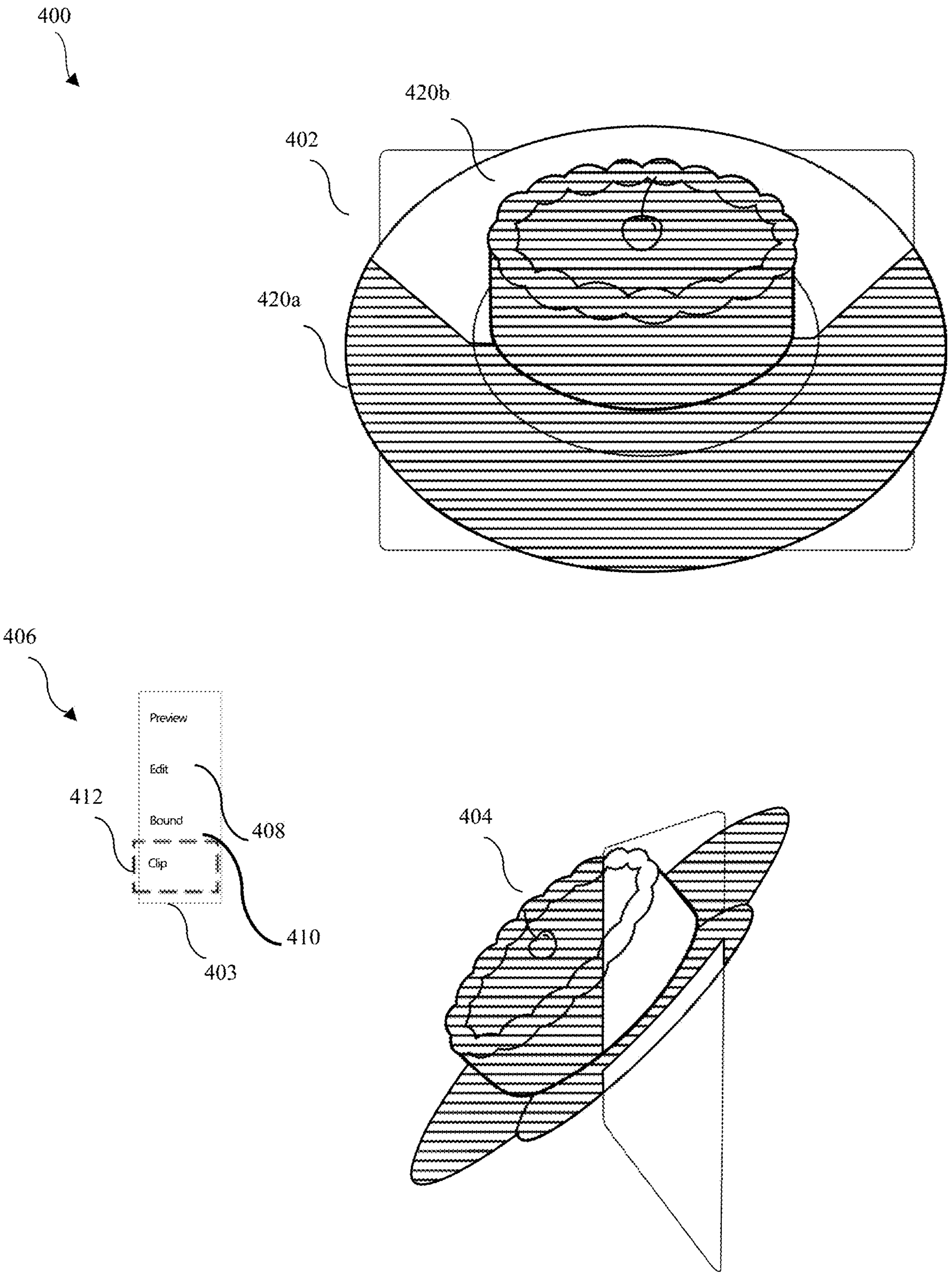

In one or more examples, rather than or in addition to using a bounding volume to determine which portions of a content item will be clipped (i.e., not visible in the three-dimensional environment due to exceeding the bounds of the three-dimensional environment), the user interface 400 applies one or more visual indicators to the content item to delineate which portions of the content item will be visible within the three-dimensional environment associated with the content application, and which portions of the content item will be clipped and thus not visible. FIG. 4D illustrates an exemplary user interface wherein one or more visual indicators are included in the interface to delineate clipped and unclipped portions of a content item. In the example of FIG. 4D, the device detects selection 403 of selectable option 412 (labeled as "clip") corresponding to displaying one or more visual indicators on the portions of the content item that will be clipped in the three-dimensional environment of the content application associated with the content item 402 and 404 in the content preview. In one or more examples, and in response to the selection 403 of selectable option 412, the electronic device applies one or more visual indicators to the portions of the content item that are clipped and/or to the content items that will remain unclipped as illustrated in FIG. 4D.

In one or more examples, the determination of what portions of the content item to apply a visual indicator to, so as to indicate that the portion is clipped is based on comparing the size information of the content item (described above) with the size information of the three-dimensional environment (described) and determining which portions of the content item 402 and 404 exceed the bounds of the three-dimensional environment. Optionally, the device can calculate the bounding volume as described above and use the calculated bounding volume to determine which portions of the content item will be clipped, without actually displaying the bounding volume on the as illustrated in FIG. 4D.

In one or more examples, the one or more visual indicators include applying a color or highlighting to the portions of the content item. For instance, using content item 402 in the example of FIG. 4B, a first portion 420*a* is highlighted/colored in a manner that makes it visually distinct from second portion 420*b* thus indicating that first portion 420*a* exceeds the boundaries of the three-dimensional environment and thus will be clipped when the content item 402 is viewed in a three-dimensional environment of the content application associated with the content item. In some aspects, information may accompany the highlight—for example, a text label indicating showing the amount that the object exceeds the bounds (e.g., a sphere exceeding the bounds by 5 cm as a maximum distance from the application bounds has a label indicating "5 cm" optionally with line indicating the dimension of the measurement). The text label is option overlaid over the portion of the object to which the visual indicators are applied (e.g., highlighting, etc.). In the example of FIG. 4B, the second portion 420*b* of content item 402 does not have any visual indicator applied to it, thereby indicating that the second portion 420*b* will be visible within the three-dimensional environment of the content application associated with content item 402. Optionally, a visual indicator can be applied to portion 420*b* (not shown) that is visually distinct from the visual indicator used at portion 420*a*, to indicate that portion 420*b* is unclipped. Although primarily described as applying a color or highlighting, it is understood that the visual indicator is not so limited. For example, the visual indicator optionally includes applying shading or patterning to the portions of the content item outside of the application bounds. Additionally or alternatively, portions of the object outside of the application bounds are displayed with reduced opacity (increase transparency) relative to portions of the object with the application bounds. In one or more examples, the change in opacity/transparent is applied using a gradient (e.g., increasing transparency outside the application boundaries as distance from the application boundary increases).

In some examples, in addition to displaying one or more visual indicators (e.g., highlighting, etc.) to the portions of the content item that exceed the bounds of a bounding volume, in instances where the preview application displays the source code associated with a virtual object along with the preview (for example, see FIGS. 6A-F below), the preview application can also highlight the portion of the code that includes the virtual object that exceeds the bounds (e.g., to direct attention to the source code that may require modification for improved operation). In some examples, the electronic device via the preview application can provide suggestions for code modifications that would cause the virtual object to fit within the bounds without any clipped portions (e.g., portions that exceed the bounds of the bounding volume).

Figure 4E:
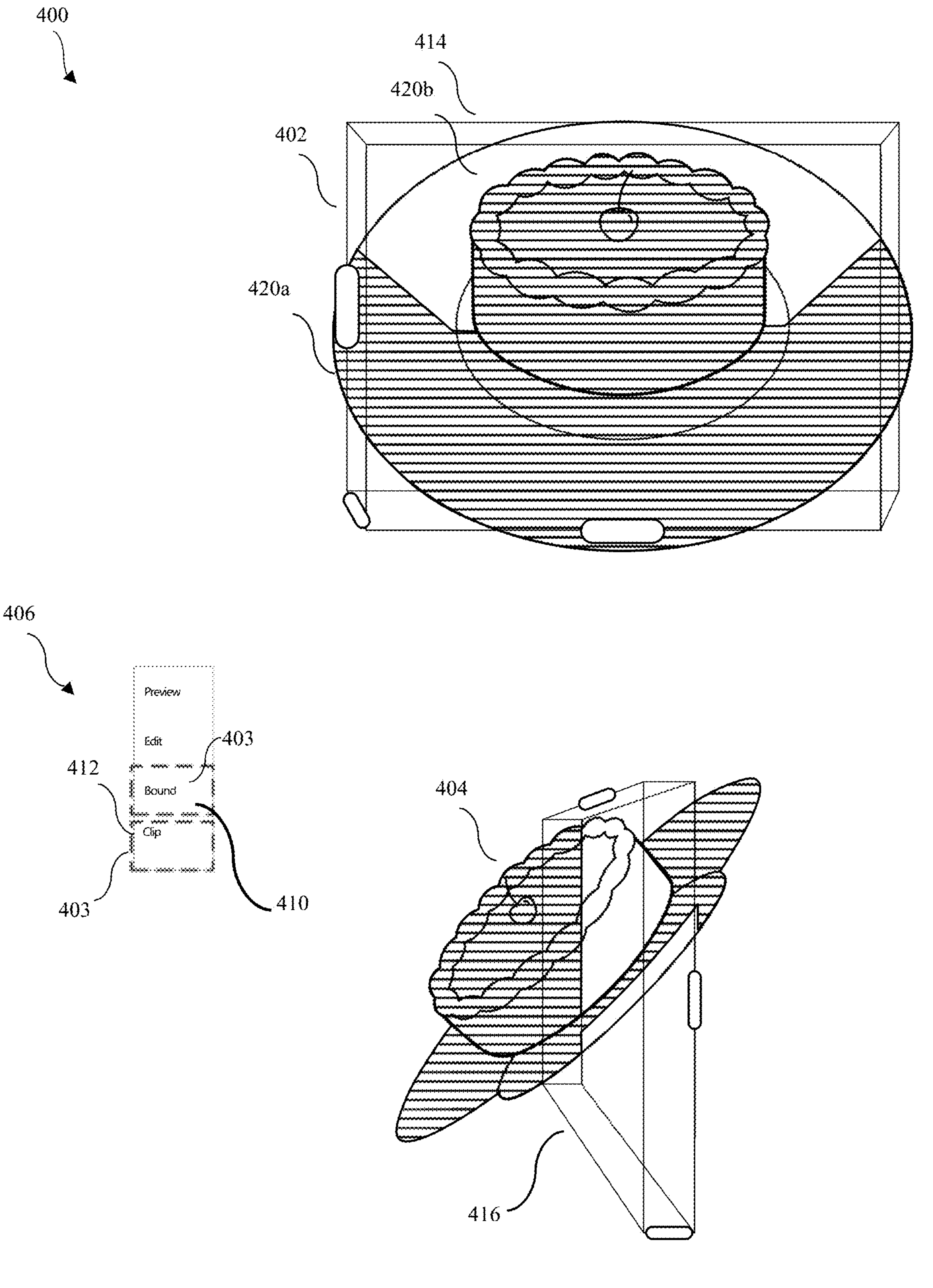

In one or more examples, the user interface 400 includes both the three-dimensional bounding volume as well as the visual indicators in the content preview to indicate which portions of a content item will be clipped when displayed in a three-dimensional environment of the content application associated with the content item. FIG. 4E illustrates an exemplary user interface 400 that includes both a three-dimensional bounding volume as well as one or more indicators to illustrate which portions of a content item will be clipped when displayed in a three-dimensional environment of the content application associated with the content item. In the example of FIG. 4E, the device detects selection 403 of both selectable option 412 (labeled as "clip") as well as selectable option 410 (labeled as "bound") corresponding to displaying both one or more visual indicators on the portions of the content item that will be clipped in the three-dimensional environment of the content application associated with the content item 402 and 404 in the content preview, as well as a three-dimensional bounding volume. In one or more examples, and in response to the selection 403 of both selectable options 410 and 412, the electronic device applies one or more visual indicators to the portions of the content item that are clipped and/or to the content items that will remain unclipped as well as illustrating a three-dimensional bounding volume. For instance, as illustrated with respect to content item 402 in FIG. 4E, the user interface 400 includes both the three-dimensional bounding volume 414 as well visual indicators at portion 402*a* of content item 402, to indicate which portions of the content item 402 will be clipped when displayed in a three-dimensional virtual environment of the content application associated with the content item 402. In one or more examples, the user can select (or deselect) the object to show the highlighting described above.

Figure 5:
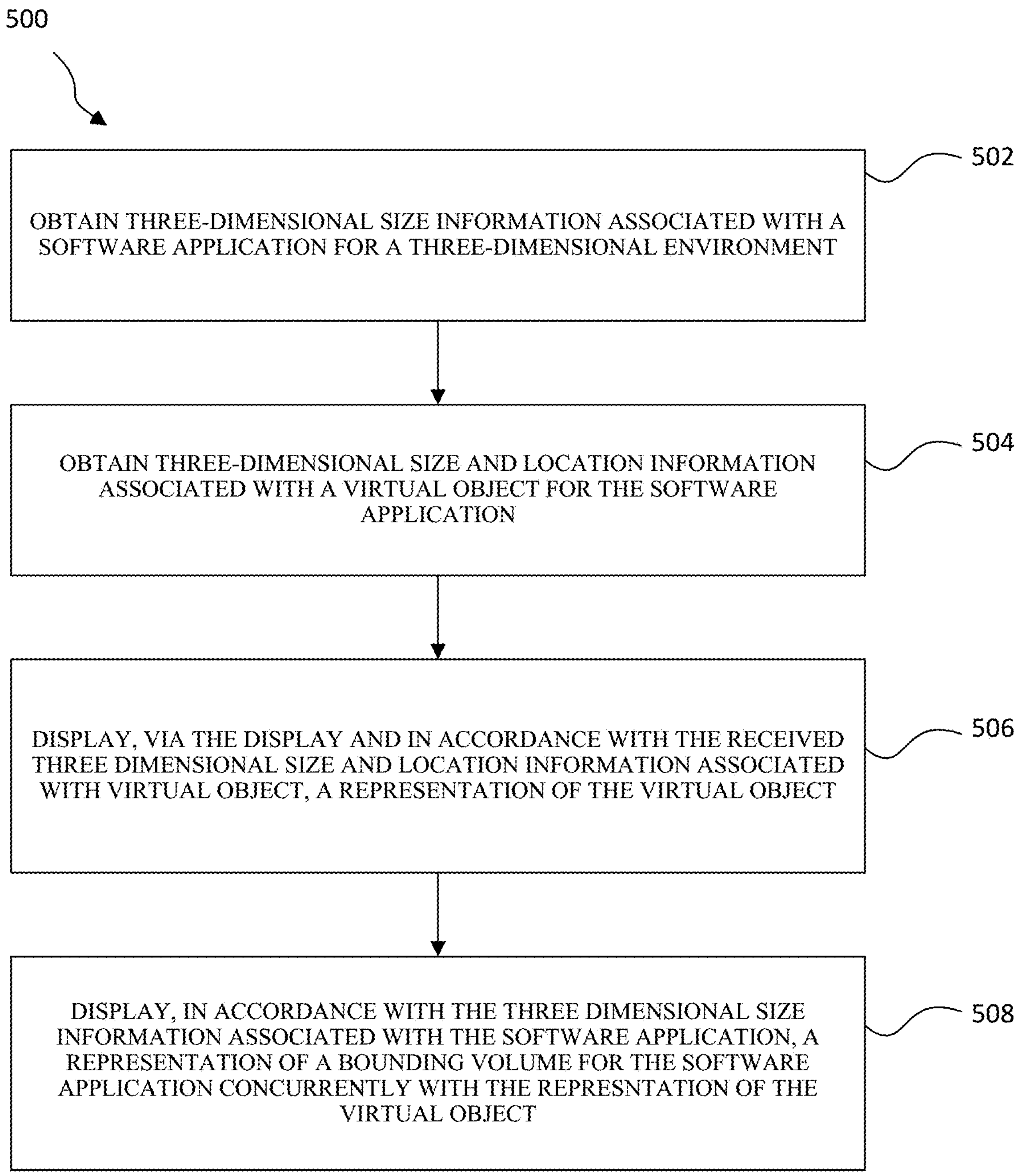
FIG. 5 illustrates a flow diagram of a process for displaying a bounding volume in a content preview according to examples of the disclosure.

FIG. 5A illustrates a flow diagram illustrating a process 500 for interaction with a preview according to some examples of the disclosure. For example, the interaction can include generating a bounding volume (e.g., a box or other volume) and/or generating a visual indicator to show portions of a three-dimensional virtual object that may be clipped (i.e., not visible) when the virtual object is rendered in a three-dimensional environment of a content application associated with the virtual object. Process 500 begins, at a first electronic device (e.g., a head-mounted display or other computing device), with the display of a user interface that includes one or more previews of three-dimensional virtual objects. In one or more examples, the first electronic device may be in communication with a display generation component (e.g., a display) and one or more input devices (e.g., hand tracking sensor, eye tracking sensors, image sensors, etc.). In one or more examples, at 502 the electronic device receives three-dimensional size information associated with a software application. The three-dimensional size information associated with the software application is optionally received at the electronic device from a content application that is associated with the three-dimensional object being previewed. In one or more examples, and as described above, the three-dimensional size information received at 502 includes (but is not limited to) length, size, and width information about the three-dimensional environment.

In one or more examples, at 504, the device receives three-dimensional size and location information associated with a virtual object in of the software application. As described above, the three-dimensional size information includes (but is not limited to) information regarding the size, length, and width of the object (including information about the contours of the object) as well as location information (i.e., where inside of the three-dimensional environment of the software application the object is located). In one or more examples, and in response to a user input on a user interface (as described above with respect to FIGS. 4A-E), the device displays a representation of the virtual object at 506. In one or more examples, the three-representation is based on the received three-dimensional size and location information associated with the three-dimensional virtual object.

In one or more examples, at 508, the device displays, via the display generation component, and in accordance with the obtained three-dimensional size information associated with the three-dimensional environment, a bounding volume concurrently with the three-representation of the virtual object. As described above, the bounding volume is positioned on the user interface to illustrate the size and position relationship between the virtual object being previewed and the bounding volume to allow for the user to better ascertain which portions of the virtual object will be clipped when the object is rendered in a three-dimensional environment of a content application associated with the three-dimensional object.

In one or more examples, a user previewing a content item according to the examples described above will want to modify an aspect of the content item by modifying the application code associated with the content item and then compare the modified content item with the original (pre-modification) content item (e.g., corresponding to the original, pre-modification application code). Additionally, the user will want visually compare multiple "snapshots" of previews a content item, with each snapshot representing a separate and distinct version of the content item corresponding to distinct application code. In some circumstances, in an instance where a user may be dissatisfied with a modification of a content item (based on its visual appearance), the user may want the ability to restore the content item to a previous version prior to the application of one or more modifications. Thus, in one or more examples, in order to provide an enhanced and improved user experience as described above the preview application described above includes one or more user interfaces (described in further detail below) that allow for a user to visualize and compare modifications to a content item and restore the content item to previous states if a modification that was made is no longer desired.

FIGS. 6A-6F illustrate exemplary user interface 600 and/or user interactions with one or more objects of a preview according to examples of the disclosure. In one or more examples, the exemplary user interfaces of FIGS. 6A-6F are configured to allow a user previewing a content item based on application source code associated with the content item to compare multiple versions of the content item associated with various modifications to the source code associated with the content item. As discussed above, the preview of the content item may provide the user with improved perspective regarding the appearance and form of the content item. As discussed below, various methodologies are provided for interacting with and manipulating the preview of the content item, such that an enhanced and improved user experience is provided for viewing the content item.

Figure 6A:
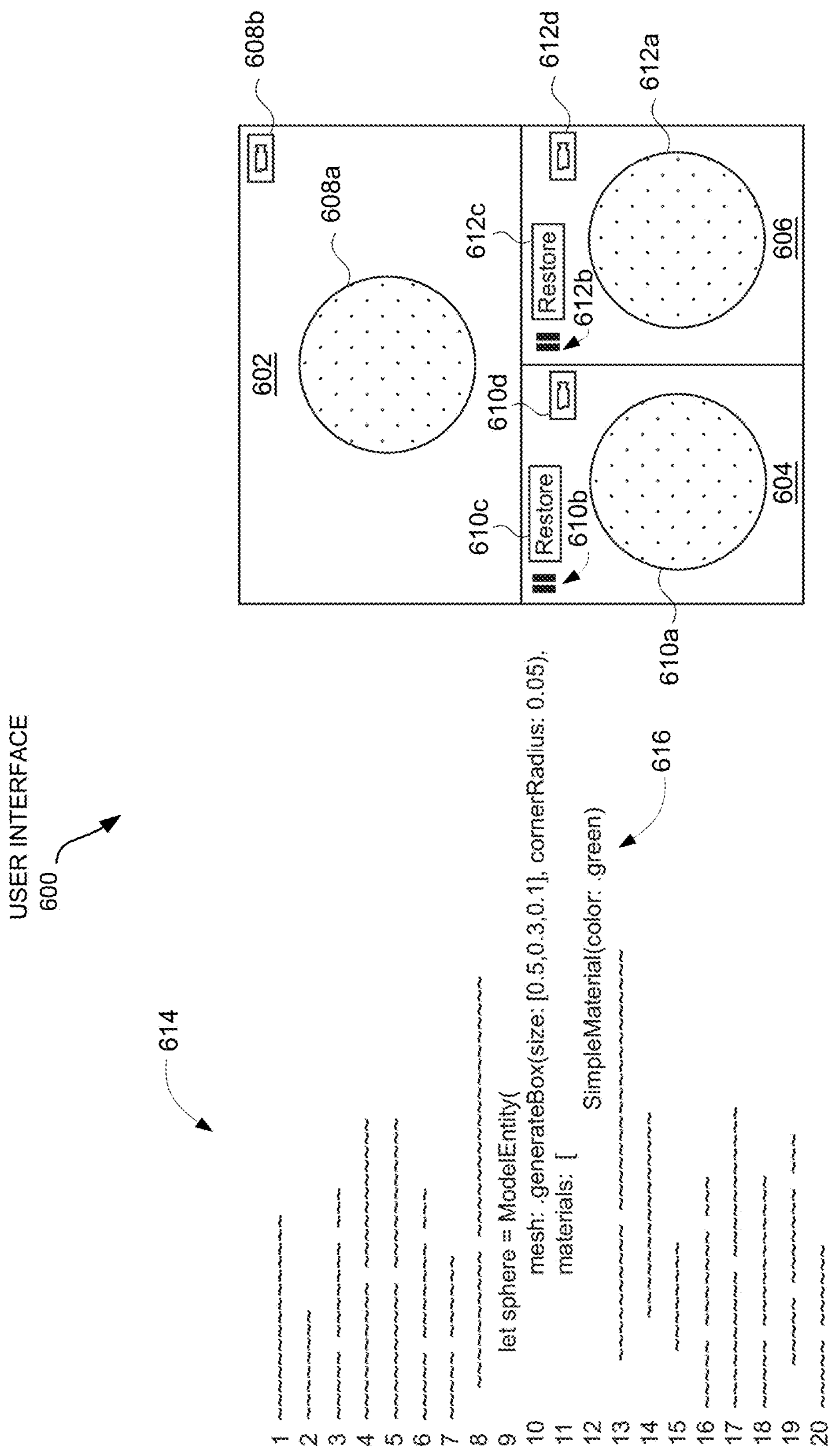
FIGS. 6A-6F illustrates exemplary user interfaces for content previews according to examples of the disclosure.

FIG. 6A illustrates an exemplary user interaction with the user interface 600 wherein the user previews one or more content items associated with source code 614. In one or more examples, source code 614 represents a portion of the source code associated with a software application that is executed on an electronic device. In one or more examples, source code 614 includes source code associated with one or more virtual objects that are part of application. For instance, source code 614 includes code for a virtual sphere. A developer of the application can modify the virtual sphere by making one or more modification to the source code 614. For instance, the developer by modifying the source code can change the size and/or the color of the sphere. In one or more examples, the developer can modify the source code using user interface 600. Additionally or alternatively, the source code can be modified on a separate application or device and then imported by the device and displayed at user interface 600.

In one or more examples, a virtual object that is part of the application and is part of the source code 614 is visually previewed at one or more "viewports" such as viewports 602, 604, and 606 shown in FIG. 6A. In some examples, a "viewport" refers to a portion of the user interface that is independent from other portions of the user interface and that includes a visual preview of a content item found in the source code 614. For instance, in the example of FIGS. 6A-6F, each of viewports 602, 604, and 606 is independent of the others (e.g., independently controlled as described in detail below), and includes its own preview of the virtual object (608*a*, 610*a*, and 612*a* respectively) referenced in the corresponding respective source code. In one or more examples, each viewport can preview the virtual object along with a bounding volume or one or more clipped regions according to the methods and examples described above. In one or more examples, and as described in further detail below, each viewport can be configured to display a three-dimensional "scene" that can be navigated and/or rotated by the user of the preview application for the purpose of previewing application content. The examples and methods described above with respect to FIGS. 4A-E can be implemented at each of the viewports described below.

In one or more examples, a first viewport of the one or more viewports of user interface 600 can be configured to operate as a primary viewport. A "primary" viewport can refer to a viewport that is configured to provide a visual preview of the virtual object in the source based on the current status of the source code. Thus, in one or more examples, if the virtual object in the source code 614 is modified by the user, the visual content preview of the primary viewport is automatically updated (in real-time or near real-time, such as less than 100 ms) to reflect the modification made to the source code. In the example of user interface 600 of FIGS. 6A-6F, viewport 602 can operate as a primary viewport. Thus, in one more examples, any modifications made to the source code 614 that would create a change in the visual appearance of the virtual object, will automatically reflected in the content preview 608*a* of primary viewport 602. As will discussed in further detail, non-primary viewports can be selectively configured to automatically updated in response to modifications to the source code. However, with respect to the primary viewport, the primary viewport will optionally always automatically update in response to a change in the source code that changes the visual appearance of the virtual object.

In one or more examples, primary viewport 602, as well viewports 604 and 606, include a selectable option 608*b*, 610*d*, and 612*d*, respectively, for changing a perspective of the visual preview of the viewport. For instance, in response to detecting user selection of selectable option 608*b*, the device initiates a process to change the visual perspective of content preview 608*a* such that the user views the visual preview from a different perspective (e.g., a top view, side view, a bottom view, etc.). Additionally or alternatively, the device in response to detection selection of selectable option 608*b*, optionally allows the user to manually change the perspective by, for instance, clicking and dragging the visual preview to rotate the view of the content preview. The examples of FIG. 6A-6F include a single primary viewport 602, and two non-primary viewports 604 and 606 for purposes of illustration, however the examples should not be seen as limiting, and the systems and methods described herein should be understood to apply to user interface with any number of primary and non-primary viewports.

In one or more examples, viewports 604 and 606 (e.g., non-primary viewports) include one or more selectable options 610*d* and 612*d* respectively that allow the user to take a "snapshot" of a code modification as described in further detail below. Selectable options 610*b* and 612*b*, are configured to allow the user to toggle between a "play" mode and a "pause" mode. In the example of FIG. 6A, selectable options 610*b* and 612*b* are set to the "play" mode, which means that the viewports 604 and 606 associated with the selectable options will display a preview of the virtual object in accordance with the current version of the source code 614. For instance, as shown in the example of FIG. 6B, when the user modifies the color of the virtual sphere from green to blue as indicated at 616, the preview at the primary viewport will change to blue, as will the previews at viewports 604 and 608, since those viewports are set to the "play" mode as described above.

Figure 6B:
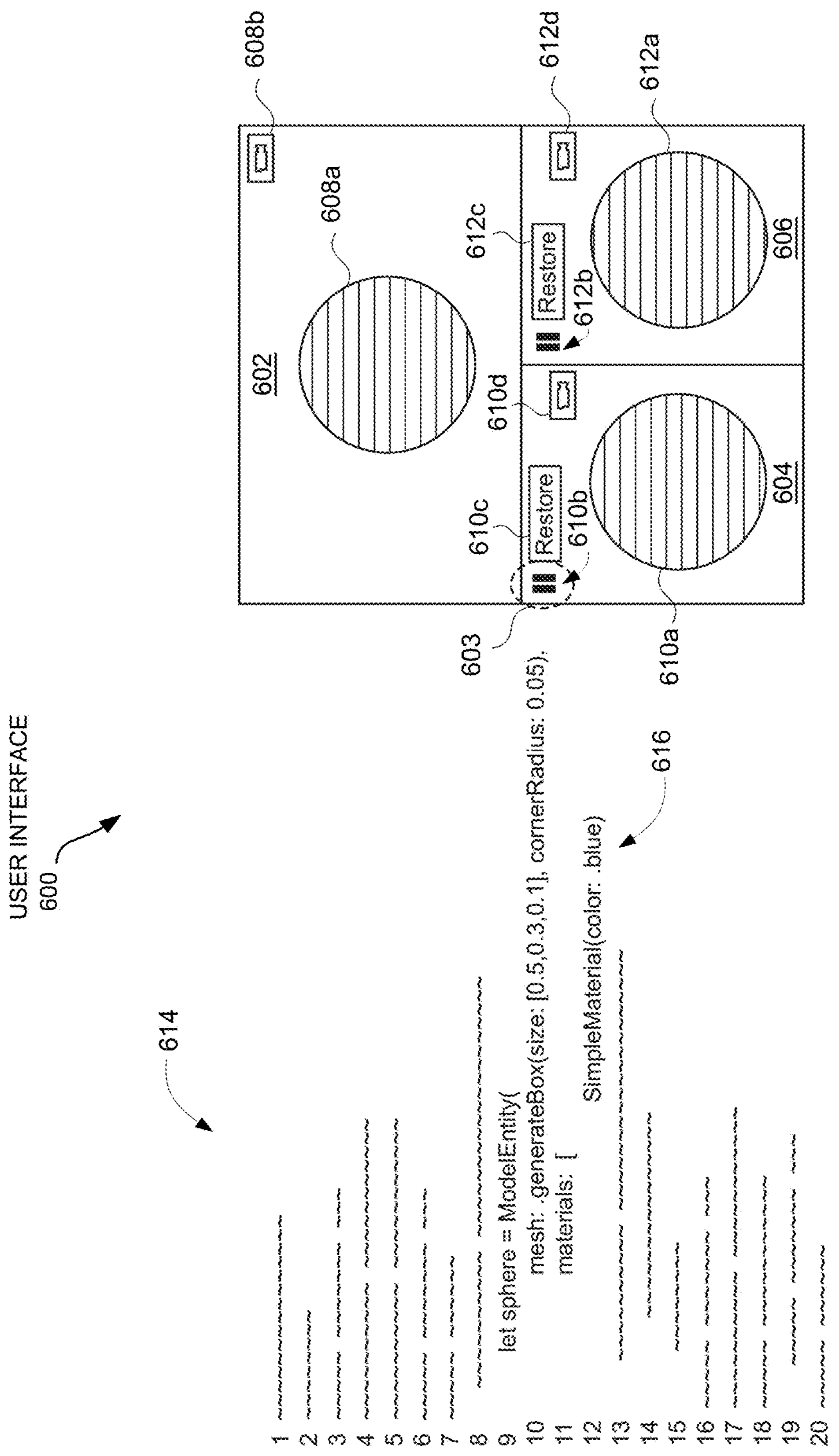
Figure 6C:
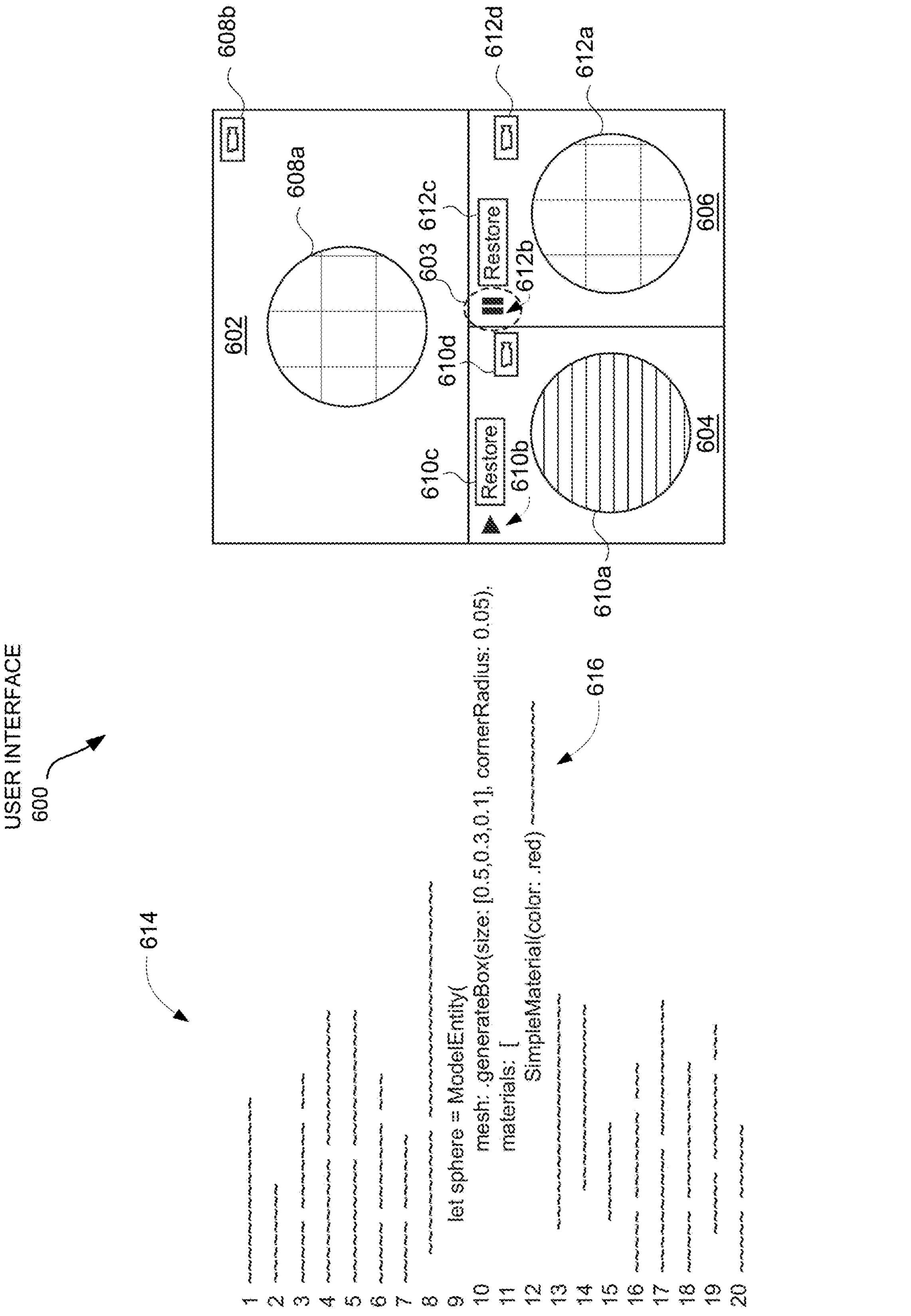

In one or more examples, as illustrated at FIG. 6B and described above, the non-primary viewports 604 and 606 include a selectable option 610*b* and 612*b* respectively for toggling the viewports between a play mode and a pause mode. In some examples, the selectable options 610*b* and 612*b* include visual indicators to indicate what mode the viewport associated with the selectable option is in. For instance, if a viewport is in the pause mode, then selectable option 610*b* and 612*b* can include a "play" button visual indicator, indicating that if the selectable option is selected, the viewport will transition from the pause mode to the play mode. In the example of FIG. 6B, in response to detecting selection of selectable option 610*b* (e.g., via a tap of the touchscreen at touchpoint 603) the device switches the mode of viewport 604 from a play mode to the pause mode as illustrated at FIG. 6C. In the example of FIG. 6C, viewport 604 is now set to the pause mode (due to selection of selectable option 610*b* in FIG. 6B) while viewport 606 is still in play mode as described above. Thus, in one or more examples, in response to being in pause mode, the device generates a "snapshot" of the virtual object based on the state of the virtual object at the time that the pause mode was initiated by the user of the device. A "snapshot" refers to one or more actions taken by the device to preserve and/or store the state of the virtual object at the time when the pause mode was initiated by the user of the device. For instance, in one or more examples, the snapshot can include, but is not limited to, storing a copy of the source code associated with the preview of the virtual object at the viewport at the time the pause was initiated, and storing the preview image of the virtual object in memory from which it is displayed in the viewport (and does not change in response to changes in the source code) while the viewport is in the pause mode (e.g., until the user toggles the viewport to play mode).

In the example of FIG. 6C, with viewport 604 in pause mode, when the user modifies the source code 614 to change the color of the sphere to red at 616, the device modifies the content preview 608*a* of primary viewport 602 such that the sphere is red since the primary viewport follows the modifications of the source code as described above. Likewise, the device modifies the content preview 612*a* of viewport 606 such that the sphere is red since viewport 606 is set to play mode and thus continues to follows the modifications of the source code as described above. However, viewport 604 does not follow the modification since viewport 604 is set to pause mode as described above. Instead, viewport 604 displays the content preview 610*a* associated with the source code in the form it was when the snapshot was generated (i.e., when the user put viewport 604 into pause mode). Thus, as illustrated in FIG. 6C, content preview 610*a* of viewport 604 displays the sphere as blue, the color it was when the snapshot was generated (at FIG. 6B).

Figure 6D:
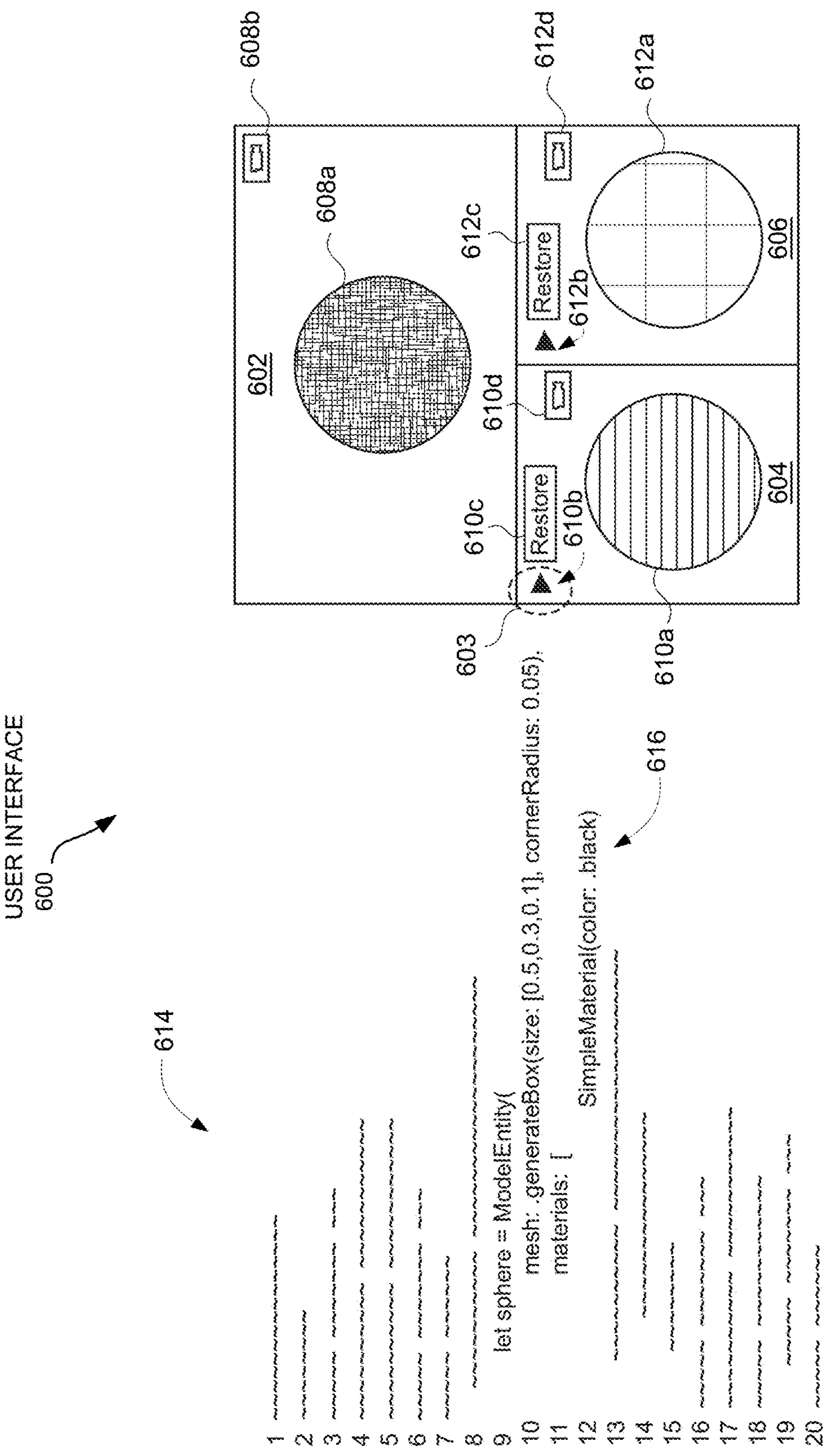

In the example of FIG. 6C, in response to detecting selection of selectable option 612*b* (e.g., via a tap of the touchscreen at touchpoint 603 or any other form of input including a mouse click or keyboard entry) the device switches the mode of viewport 606 from a play mode to the pause mode as illustrated at FIG. 6D. In the example of FIG. 6D, viewport 606 is now set to the pause mode (due to the selection of selectable option 612*b* in FIG. 6C). Thus, as illustrated in FIG. 6D both viewports 604 and 606 are now set to pause mode. However, since the viewports 604 and 606 were set to pause at different instances of time, each viewport displays a content preview commensurate with the snapshot of the source code that was stored at the time in which that particular viewport was placed into pause mode. Thus, in the example of FIG. 6D, when the source code 614 is modified to make the sphere black at 616, the primary viewport 602 follows the modification and displays a content preview 608*a* with a black sphere. Viewport 604 displays a content preview 610*a* with a blue sphere, since the pause mode was initiated by the user when the source code had the sphere set to blue (as discussed above with respect to FIG. 6B). Viewport 606 displays a content preview 612*a* with a red sphere, since the pause mode was initiated by the user when the source code had the sphere set to red (as discussed above with respect to FIG. 6C). As illustrated in FIG. 6D, the device displays three different content previews (e.g., black, red, and blue) thus allowing the user to visually compare and contrast the various modifications (and optionally select one of them to use in the application associated with the source code).

Figure 6E:
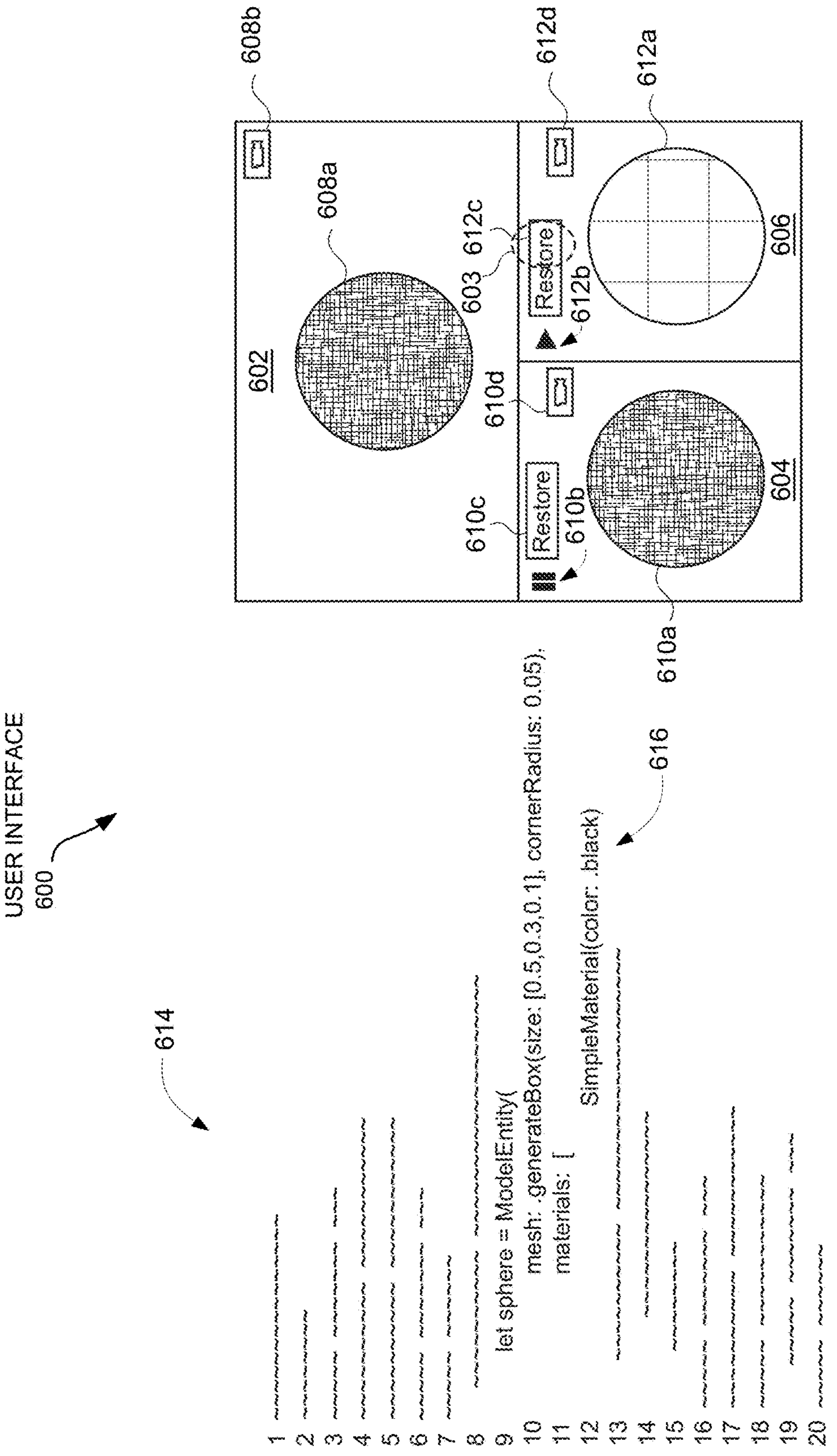

In one or more examples, in the example of FIG. 6D, and in response to detecting selection of selectable option 610*b* at viewport 604 (e.g., via a contact of the touchscreen at 603), viewport 604 is placed back into play mode as illustrated in FIG. 6E. As illustrated in FIG. 6E, the content preview 610*a* of viewport 604 is updated to black to reflect the state of the source code 614, and in particular the state of the color of the sphere at 616 which is black. Optionally, the snapshot generated at FIG. 6B (when the sphere was blue) can be deleted once viewport associated with the snapshot (e.g., viewport 604) is put back into play mode. Optionally, the snapshot generated at FIG. 6B can be retained by the device for later access by the user. As illustrated in FIG. 6E, viewport 606 retains the preview of the red sphere associated with the state of the source when viewport 606 was put into pause mode.

Figure 6F:
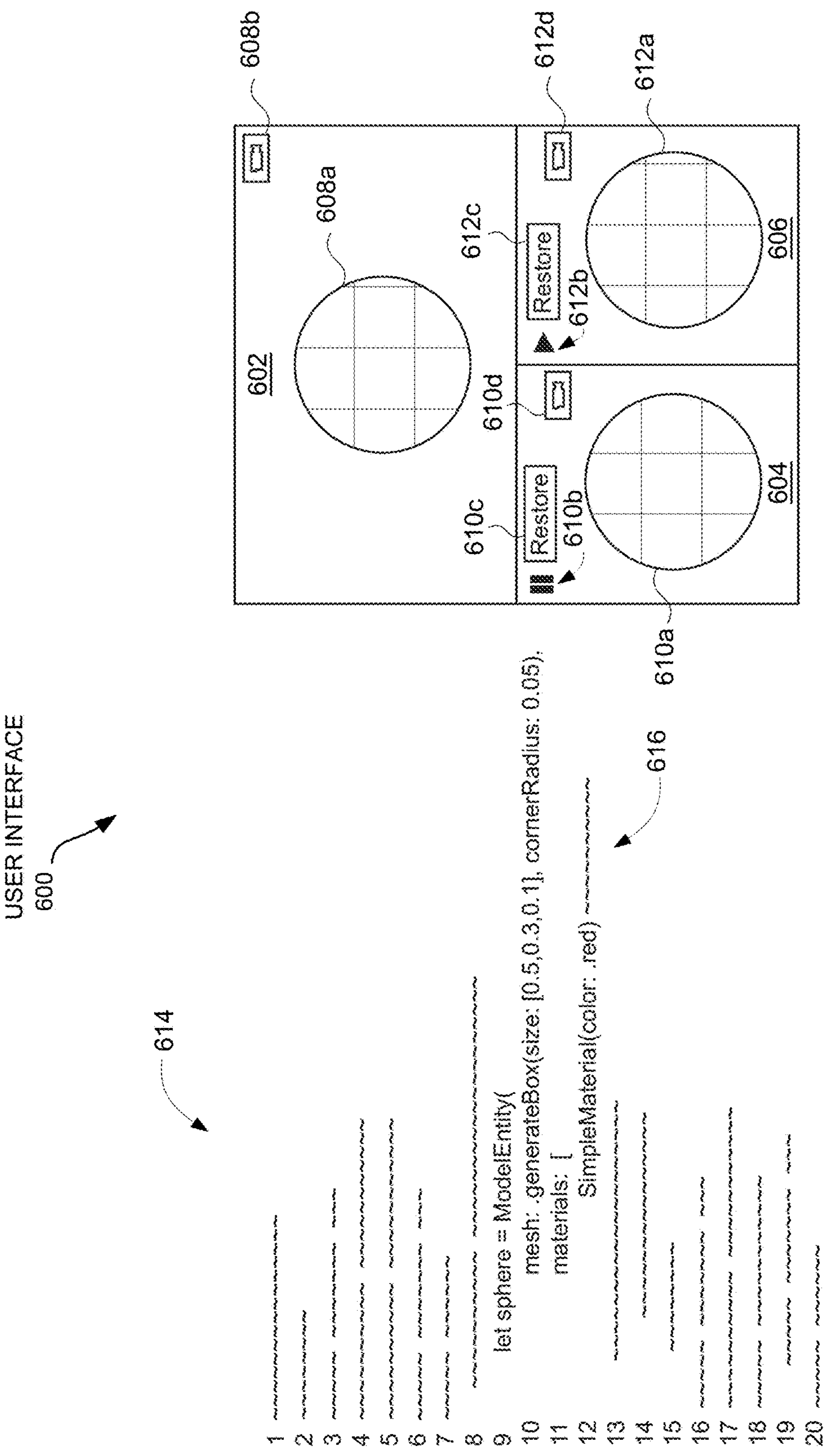

In one or more examples, and as illustrated at FIG. 6E, each of viewports 604 and 606 (i.e., the non-primary viewports) each include a selectable option 610*c* and 612*c* respectively for restoring the source code 614 to the state associated with the snapshot associated with the content preview displayed at each viewport. For instance, as illustrated in FIG. 6F, in response to detecting selection of selectable option 612*c* (e.g., via a contact of the touchscreen at 603), the source code 614 is restored to the state of that the source code was in when the sphere was red at FIG. 6C (e.g., the state when viewport 606 was put into pause mode). As illustrated in FIG. 6F, in response to being source being restored to a state in which the sphere was red, the content preview 608*a* of primary viewport 602 reverts back to a red sphere. Additionally, since viewport 604 is in the play state (due to the input received at FIG. 6D), the content preview 610*a* of viewport 604 is also modified to display a red sphere in accordance with the current state of the source code 614 being red as indicated at 616. Additionally, in one or more examples, the source code 614 is changed to match the source code associated with the snapshot being restored.

Figure 7:
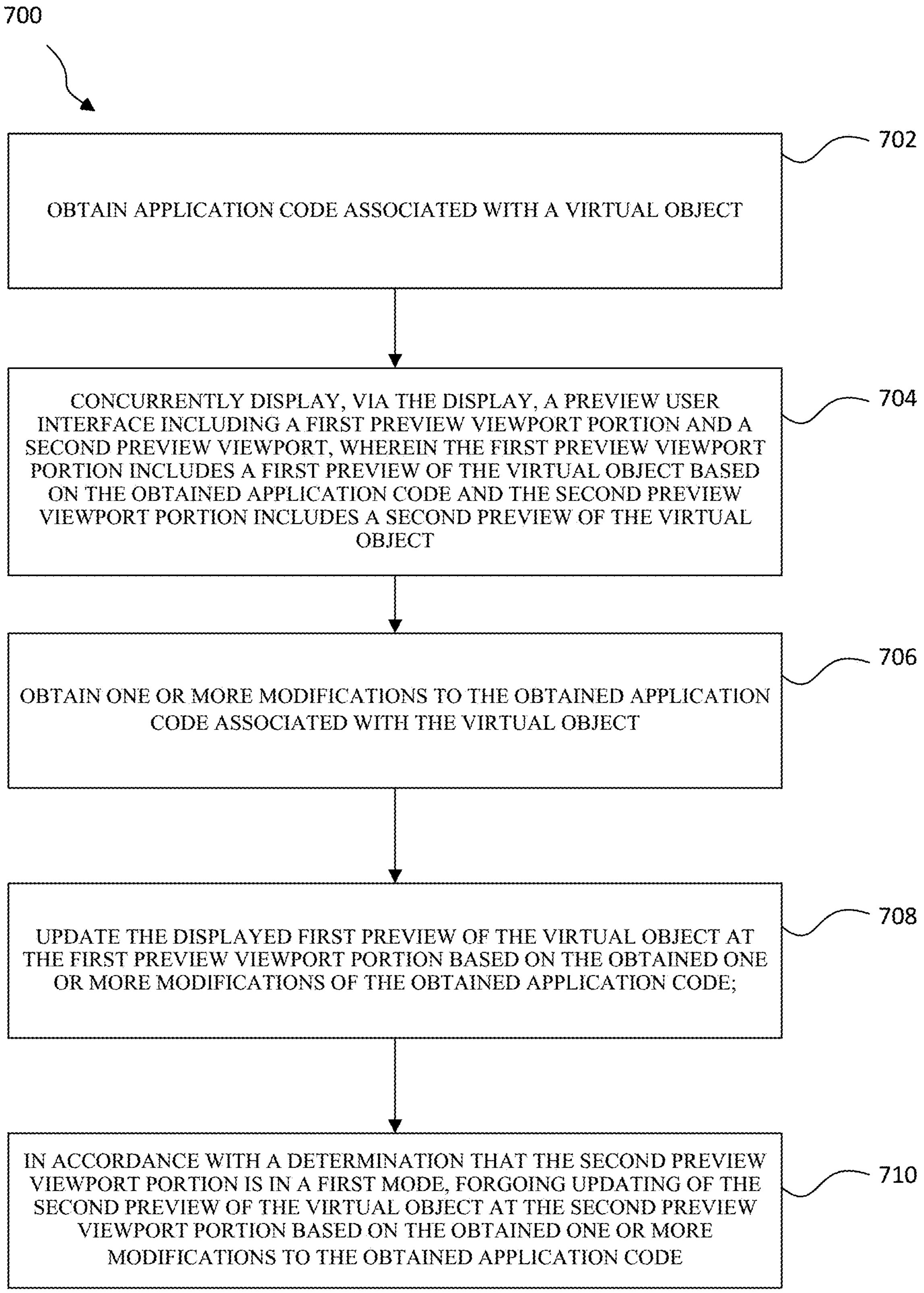
FIG. 7 illustrates a flow diagram of a process for previewing virtual object in a content preview application according to examples of the disclosure.

FIG. 7 illustrates a flow diagram illustrating a process 700 for interaction with a content preview according to some examples of the disclosure. For example, the interaction can include interacting with the content preview user interface 600 discussed above with respect to FIGS. 6A-6F described above. In one or more example, the process 700 of FIG. 7 begins at 702, wherein an application source code (or a portion thereof) is obtained. In one or more examples, and as described above, the application source code contains code pertaining to a virtual object (e.g., an object that is to be displayed in the application). In one or more examples, once the application code has been obtained at 702, the process continues at 704 to display a first preview of the virtual object on a preview user interface. In one or more examples, the preview interface includes a first preview viewport portion at which the first preview is displayed (e.g., a primary viewport such as viewport 602). Concurrently a second preview of the virtual object is displayed at a second preview viewport of the preview user interface (e.g., a secondary viewport such as viewport 604).

In some examples, the process continues at 706 wherein one or more modifications to the obtained application code are received (e.g., the source code 614 shown on the left side in FIG. 6A-6F is edited). In one or more examples, the modifications include a modification to a characteristic of the virtual object. For instance, the modification can include a modification to the appearance of the virtual object. In one or more examples, at 708, in response to the modification the first preview viewport portion is updated based on the received modification to the virtual object (e.g., the primary viewport is updated to reflect the latest code). However, at 710, and in accordance with a determination that the second preview viewport portion is in a first mode (e.g., a pause mode), the second preview portion is not updated based on the modification with the source code, but instead retains the preview of the virtual object in accordance with the state of the source code when the second preview viewport portion was placed into the first mode (e.g., the pause mode).

Therefore, according to the above, some examples of the disclosure are directed to a method comprising: at an electronic device in communication with a display and one or more input devices: obtaining, from an operating system, three-dimensional size information associated with a software application for a three-dimensional environment that has been granted to the software application by the operating system, obtaining, from the software application, three-dimensional size and location information associated with a virtual object of the software application, displaying, via the display and in accordance with the three-dimensional size and location information associated with the virtual object, a representation of the virtual object, and displaying, via the display and in accordance with the three-dimensional size information associated with the software application, a representation of a bounding volume for the software application concurrently with the representation of the virtual object.

Optionally the method further comprises: determining, based on the obtained three-dimensional size and location information associated with the virtual object and based on the three-dimensional size information associated with software application that a portion of the virtual object is outside of the bounding volume, and in accordance with the determination that at least a portion of the virtual object is outside of the bounding volume, displaying the representation of the virtual object with the displayed bounding volume such that the portion of the representation of the virtual object is outside of the bounding volume.

Optionally, the method further comprises: while displaying the representation of the virtual object such that the portion of the representation of the virtual object is outside of the bounding volume, receiving, via the one or more input devices, an indication to apply one or more visual attributes at the portion of the representation of the virtual object that is outside of the bounding volume, and in response to the received input corresponding to a request to apply the one or more visual attributes, displaying one or more visual attributes at the portion of the representation of the virtual object that is outside of the bounding volume.

Optionally, the one or more visual attributes are configured to visually distinguish the portion of the representation of the virtual object that is outside of the bounding volume from one or more portions of the representation of the virtual object that are inside of the bounding volume.

Optionally, the method further comprises: determining, based on the size and location information associated with the virtual object and based on the size information associated with the software application that the virtual object fits within the bounding volume, and in accordance with the determination that the virtual object fits within bounding volume, displaying the representation of the virtual object within the displayed bounding volume.

Optionally, the method further comprises: while displaying the representation of the virtual object, and while displaying the bounding volume, receiving, via the one or more input devices, an input corresponding to a selection to remove the bounding volume from being displayed, and in response to receiving the first input, ceasing display of the bounding volume.

Optionally, the size information associated with the software application includes information associated with a width, a height, and a depth of the software application.

Optionally, the size information associated with the width, height, and depth of the software application are displayed concurrently with the bounding volume.

Optionally, displaying the bounding volume concurrently with the representation of the virtual object includes displaying a first representation of the bounding volume concurrently with a first representation of the virtual object from a first viewpoint and displaying a second representation of the bounding volume concurrently with a second representation of the virtual object from a second viewpoint, different from the first viewpoint.

Optionally, the method comprises displaying a visual indicator indicating a corresponding size of the virtual object in the three-dimensional environment relative to a size of a physical object that is associated with the virtual object.

In one or more examples, a method comprises: at an electronic device in communication with a display generation component and one or more input devices: obtaining three-dimensional size information associated with a software application for a three-dimensional environment, obtaining three-dimensional size and location information associated with a virtual object for the software application, displaying, via the display and in accordance with the three-dimensional size and location information associated with the virtual object, a representation of the virtual object, determining a bounding volume of the software application based on the three-dimensional size information associated the software application, determining that one or more portions of the representation of the virtual object are outside of the determined bounding volume of the software application, and in accordance with the determination that one or more portions of the representation of the virtual object are outside of the determined bounding volume of the software application, displaying one or more visual attributes at the one more portions of the representation of the virtual object that are outside of the determined bounding volume.

In one or more examples, a method comprises: at an electronic device in communication with a display generation component and one or more input devices: obtaining application code associated with a virtual object, while displaying a preview user interface via the display generation component, wherein the preview interface includes a first preview viewport portion, displaying a first preview of the virtual object based on the received application code and concurrently displaying a second preview of the virtual object at a second preview viewport portion of the preview interface, obtaining one or more modifications to the received application code associated with the virtual object, updating the displayed preview of the virtual object at the first preview viewport portion based on the received one or more modifications of the application code, and in accordance with a determination that the second preview viewport portion is in a first mode, forgoing updating of the second preview of the virtual object at the second preview viewport portion based on the obtained one or more modification of the application code.

Optionally, the method further comprises: in accordance with a determination that the second preview viewport portion is in a second mode, updating the second preview of the virtual object at the second preview viewport portion based on the received one or more modifications of the received application code.

Optionally, the method further comprises: in accordance with a determination that the second preview viewport is in the second mode, storing an application code snapshot associated with the virtual object displayed at the second preview viewport portion.

Optionally, the method further comprises: while the second preview viewport is in the first mode: receiving via the one or more input devices, a first input at the second preview viewport to restore the preview of the virtual object displayed at the second preview viewport, in response to receiving the first input, updating the preview of the virtual object displayed at the first preview viewport based on the stored application code snapshot associated with the virtual object displayed at the second preview viewport portion.

Optionally, the method further comprises: while the second preview viewport is in the first mode: receiving via the one or more input devices, a second input at the second preview viewport to change the second preview viewport from the first mode to the second mode, and in response to receiving the second input, updating the second preview of the virtual object displayed at the second preview viewport portion based on the received one or more modifications of the received application code.

Optionally, the method further comprises: receiving via the one or more input devices, a third input at the second preview viewport to change an orientation of the second preview of the virtual object, and in response to receiving the third input, updating the orientation of the second preview of the virtual object displayed at the second preview viewport portion.

Optionally, the method further comprises: obtaining three-dimensional size information associated with a three-dimensional environment generated by a software application associated with the application code, and displaying, at the second preview viewport portion, and in accordance with the received three dimensional size information associated the three-dimensional environment, a three-dimensional bounding volume concurrently with the second preview of the virtual object.

Some examples of the disclosure are directed to an electronic device. The electronic device can comprise: one or more processors; memory; and one or more programs stored in the memory and configured to be executed by the one or more processors, the one or more programs including instructions for performing any of the above methods.

Some examples of the disclosure are directed to a non-transitory computer readable storage medium. The non-transitory computer readable storage medium can store one or more programs, the one or more programs comprising instructions, which when executed by one or more processors of an electronic device, cause the electronic device to perform any of the above methods.

Some examples of the disclosure are directed to an electronic device. The electronic device can comprise: one or more processors; memory; and means for performing any of the above methods.

Some examples of the disclosure are directed to an information processing apparatus for use in an electronic device. The information processing apparatus can comprise means for performing any of the above methods.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:

at an electronic device including a display and one or more input devices:

obtaining application code associated with a virtual object;

concurrently displaying, via the display, a preview user interface including a first preview viewport portion and a second preview viewport portion, wherein the first preview viewport portion includes a first preview of the virtual object based on the obtained application code and the second preview viewport portion includes a second preview of the virtual object;

obtaining one or more modifications to the obtained application code associated with the virtual object;

updating the displayed first preview of the virtual object at the first preview viewport portion based on the obtained one or more modifications to the obtained application code;

in accordance with a determination that the second preview viewport portion is in a first mode, forgoing updating of the second preview of the virtual object at the second preview viewport portion based on the obtained one or more modifications to the obtained application code; and in accordance with a determination that the second preview viewport portion is in a second mode, updating the second preview of the virtual object at the second preview viewport portion based on the obtained one or more modifications of the obtained application code.

2. The method of claim 1, further comprising:

in accordance with a determination that the second preview viewport portion is in the second mode, storing an application code snapshot associated with the virtual object displayed at the second preview viewport portion.

3. The method of claim 2, further comprising:

while the second preview viewport portion is in the first mode:

receiving, via the one or more input devices, a first input at the second preview viewport portion to restore a preview of the virtual object displayed at the second preview viewport portion; and in response to receiving the first input, updating the preview of the virtual object displayed at the first preview viewport portion based on the stored application code snapshot associated with the virtual object displayed at the second preview viewport portion.

4. The method of claim 1, further comprising:

while the second preview viewport portion is in the first mode:

receiving via the one or more input devices, a second input at the second preview viewport portion to change the second preview viewport portion from the first mode to the second mode; and in response to receiving the second input, updating the second preview of the virtual object displayed at the second preview viewport portion based on the received one or more modifications of the received application code.

5. The method of claim 1, further comprising:

receiving via the one or more input devices, a third input at the second preview viewport portion to change an orientation of the second preview of the virtual object; and in response to receiving the third input, updating the orientation of the second preview of the virtual object displayed at the second preview viewport portion.

6. The method of claim 1, further comprising:

obtaining three-dimensional size information associated with a three-dimensional environment generated by a software application associated with the application code; and displaying, at the second preview viewport portion, and in accordance with the received three dimensional size information associated the three-dimensional environment, a three-dimensional bounding volume concurrently with the second preview of the virtual object.

7. An electronic device that is in communication with a display and one or more input devices, the electronic device comprising:
one or more processors;
memory; and
one or more programs, wherein the one or more programs are stored in the memory and configured to be executed by the one or more processors, the one or more programs including instructions for:
obtaining application code associated with a virtual object;
concurrently displaying, via the display, a preview user interface including a first preview viewport portion and a second preview viewport portion, wherein the first preview viewport portion includes a first preview of the virtual object based on the obtained application code and the second preview viewport portion includes a second preview of the virtual object;
obtaining one or more modifications to the obtained application code associated with the virtual object;
updating the displayed first preview of the virtual object at the first preview viewport portion based on the obtained one or more modifications to the obtained application code;
in accordance with a determination that the second preview viewport portion is in a first mode, forgoing updating of the second preview of the virtual object at the second preview viewport portion based on the obtained one or more modifications to the obtained application code; and
in accordance with a determination that the second preview viewport portion is in a second mode, updating the second preview of the virtual object at the second preview viewport portion based on the obtained one or more modifications of the obtained application code.

8. The electronic device of claim 7, the one or more programs including instructions for:
in accordance with a determination that the second preview viewport portion is in the second mode, storing an application code snapshot associated with the virtual object displayed at the second preview viewport portion.

9. The electronic device of claim 8, the one or more programs including instructions for:
while the second preview viewport portion is in the first mode:
receiving, via the one or more input devices, a first input at the second preview viewport portion to restore a preview of the virtual object displayed at the second preview viewport portion; and
in response to receiving the first input, updating the preview of the virtual object displayed at the first preview viewport portion based on the stored application code snapshot associated with the virtual object displayed at the second preview viewport portion.

10. The electronic device of claim 7, the one or more programs including instructions for:
while the second preview viewport portion is in the first mode:
receiving via the one or more input devices, a second input at the second preview viewport portion to change the second preview viewport portion from the first mode to the second mode; and
in response to receiving the second input, updating the second preview of the virtual object displayed at the second preview viewport portion based on the received one or more modifications of the received application code.

11. The electronic device of claim 7, the one or more programs including instructions for:
receiving via the one or more input devices, a third input at the second preview viewport portion to change an orientation of the second preview of the virtual object; and
in response to receiving the third input, updating the orientation of the second preview of the virtual object displayed at the second preview viewport portion.

12. The electronic device of claim 7, the one or more programs including instructions for:
obtaining three-dimensional size information associated with a three-dimensional environment generated by a software application associated with the application code; and
displaying, at the second preview viewport portion, and in accordance with the received three dimensional size information associated the three-dimensional environment, a three-dimensional bounding volume concurrently with the second preview of the virtual object.

13. A non-transitory computer readable storage medium storing one or more programs, the one or more programs comprising instructions, which when executed by one or more processors of an electronic device, cause the electronic device to:
obtain application code associated with a virtual object;
concurrently display, via the display, a preview user interface including a first preview viewport portion and a second preview viewport portion, wherein the first preview viewport portion includes a first preview of the virtual object based on the obtained application code and the second preview viewport portion includes a second preview of the virtual object;
obtain one or more modifications to the obtained application code associated with the virtual object;
update the displayed first preview of the virtual object at the first preview viewport portion based on the obtained one or more modifications to the obtained application code;
in accordance with a determination that the second preview viewport portion is in a first mode, forgo updating of the second preview of the virtual object at the second preview viewport portion based on the obtained one or more modifications to the obtained application code; and
in accordance with a determination that the second preview viewport portion is in a second mode, updating the second preview of the virtual object at the second preview viewport portion based on the obtained one or more modifications of the obtained application code.

14. The non-transitory computer readable storage medium of claim 13, the one or more programs including instructions for:
in accordance with a determination that the second preview viewport portion is in the second mode, storing an application code snapshot associated with the virtual object displayed at the second preview viewport portion.

15. The non-transitory computer readable storage medium of claim 13, the one or more programs including instructions for:

while the second preview viewport portion is in the first mode:

receiving via one or more input devices of the electronic device, a second input at the second preview viewport portion to change the second preview viewport portion from the first mode to the second mode; and in response to receiving the second input, updating the second preview of the virtual object displayed at the second preview viewport portion based on the received one or more modifications of the received application code.

16. The non-transitory computer readable storage medium of claim 13, the one or more programs including instructions for:

receiving via one or more input devices of the electronic device, a third input at the second preview viewport portion to change an orientation of the second preview of the virtual object; and in response to receiving the third input, updating the orientation of the second preview of the virtual object displayed at the second preview viewport portion.

17. The non-transitory computer readable storage medium of claim 13, the one or more programs including instructions for:

obtaining three-dimensional size information associated with a three-dimensional environment generated by a software application associated with the application code; and displaying, at the second preview viewport portion, and in accordance with the received three dimensional size information associated the three-dimensional environment, a three-dimensional bounding volume concurrently with the second preview of the virtual object.

* * * * *